(12) United States Patent  (10) Patent No.: US 8,724,100 B1
Asghari et al.  (45) Date of Patent: May 13, 2014

(54) WAFER LEVEL TESTING OF OPTICAL DEVICES

(71) Applicants: Mehdi Asghari, Pasadena, CA (US); Dazeng Feng, El Monte, CA (US)

(72) Inventors: Mehdi Asghari, Pasadena, CA (US); Dazeng Feng, El Monte, CA (US)

(73) Assignee: Kotura, Inc., Monterey Park, CA (US)

( * ) Notice: Subject to any disclaimer, the term of this patent is extended or adjusted under 35 U.S.C. 154(b) by 0 days.

(21) Appl. No.: 13/694,047

(22) Filed: Oct. 22, 2012

(51) Int. Cl.
*G01N 21/00* (2006.01)

(52) U.S. Cl.
USPC .......................................................... 356/73

(58) Field of Classification Search
USPC ................................................... 356/72–73
See application file for complete search history.

(56) References Cited

U.S. PATENT DOCUMENTS

| | | | |
|---|---|---|---|
| 5,623,340 A * | 4/1997 | Yamamoto et al. | 356/237.4 |
| 5,947,622 A | 9/1999 | Akyildiz et al. | |
| 7,378,861 B1 | 5/2008 | Malendevich et al. | |
| 7,412,138 B1 | 8/2008 | Malendevich et al. | |
| 7,658,552 B2 | 2/2010 | Asghari | |

* cited by examiner

*Primary Examiner* — Tarifur Chowdhury
*Assistant Examiner* — Abdullahi Nur
(74) *Attorney, Agent, or Firm* — Gavrilovich, Dodd & Lindsey, LLP

(57) ABSTRACT

A wafer includes multiple optical devices that each includes one or more optical components. The optical components include light-generating components that each generates a light signal in response to application of electrical energy to the light-generating component from electronics that are external to the wafer. The optical components also include receiver components that each outputs an electrical signal in response to receipt of light. The wafer also includes testing waveguides that each extends from within a boundary of one of the optical devices across the boundary of the optical device and also provides optical communication between a first portion of the optical components and a second portion of the optical components. The first portion of the optical components includes one or more of the light-generating components and the second portion of the optical components include one or more of the receiver components.

20 Claims, 17 Drawing Sheets

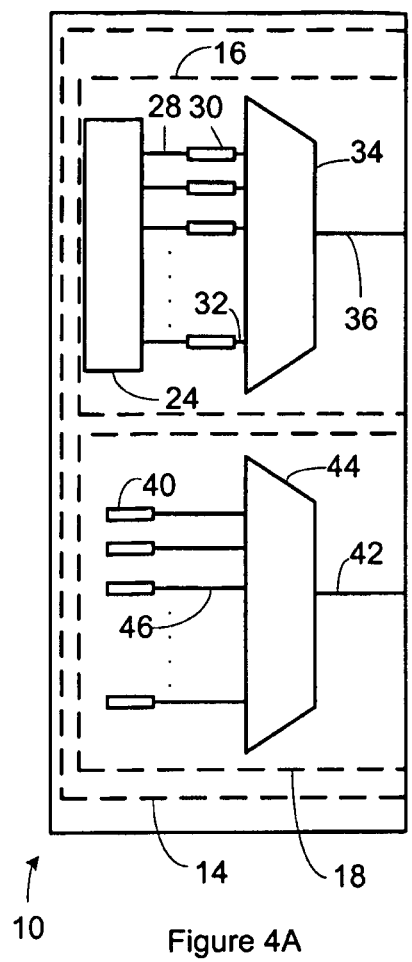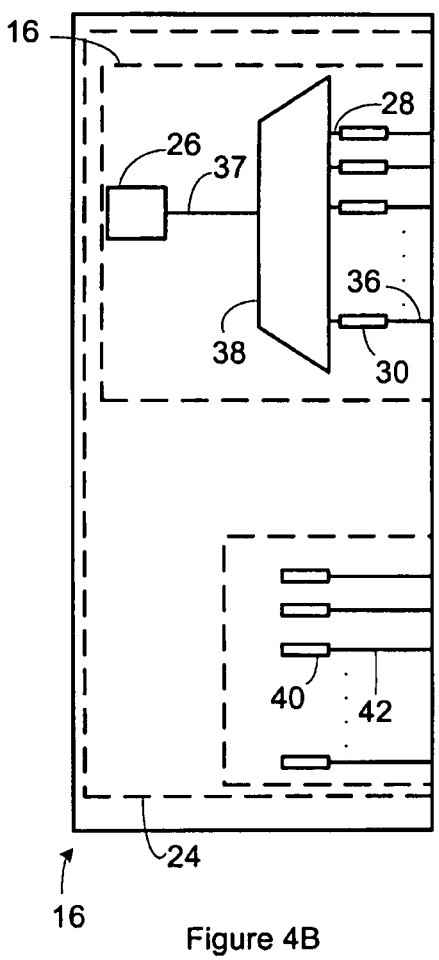
Figure 4A
Figure 4B

WAFER LEVEL TESTING OF OPTICAL DEVICES

FIELD

The present invention relates to optical devices and more particularly to optical devices positioned on a wafer.

BACKGROUND

Multiple optical devices are generally fabricated on the same wafer. However, only a certain percentage of the device on a wafer will have the required performance levels. Testing optical devices before they are removed from the wafer can save the cost of removing defective devices from the wafer and then performing additional testing on each device. However, testing optical devices while they are on a wafer requires that light be injected into the devices and then extracted after being processed by the devices. The extracted light can then be processed to determine the performance level of the devices. Due to challenges associated with alignment of the devices and the light source, this process of injecting light into the devices can be undesirably difficult, time-consuming, and/or inaccurate. As a result, an improved system for testing optical devices at the wafer level is needed.

SUMMARY

A wafer includes multiple optical devices that each includes one or more optical components. The optical components include light-generating components that each generates a light signal in response to application of electrical energy to the light-generating component from electronics that are external to the wafer. The optical components also include receiver components that each outputs an electrical signal in response to receipt of light. The wafer also includes testing waveguides that each extends from within a boundary of one of the optical devices across the boundary of the optical device and also provides optical communication between a first portion of the optical components and a second portion of the optical components. The first portion of the optical components includes one or more of the light-generating components and the second portion of the optical components include one or more of the receiver components.

BRIEF DESCRIPTION OF THE FIGURES

FIG. 4A is a schematic of a transceiver.

FIG. 4B is another schematic of a transceiver.

FIG. 11A is a topview of a portion of a device on a wafer where the chip is integrated tin the device.

FIG. 11B is a cross section of the device shown in FIG. 11A taken along the line labeled B.

FIG. 11C is a cross section of the multi-channel device shown in FIG. 11A taken along a line extending between the brackets labeled C in FIG. 11A.

FIG. 11D is a cross section of the multi-channel device shown in FIG. 11A taken along a line extending between the brackets labeled D in FIG. 11A.

FIG. 12A is a topview of the portion of the wafer having a facet recess.

FIG. 12B is a cross section of the wafer shown in FIG. 12A taken along a line extending between the brackets labeled C in FIG. 12A.

FIG. 12C is a perspective view of one of the devices shown in FIG. 12A after the devices are separated along the line labeled S in FIG. 12A. The perspective view shows the resulting facet and the portion of the facet recess that remains intact on the device after the separation.

DESCRIPTION

Figure 1A:
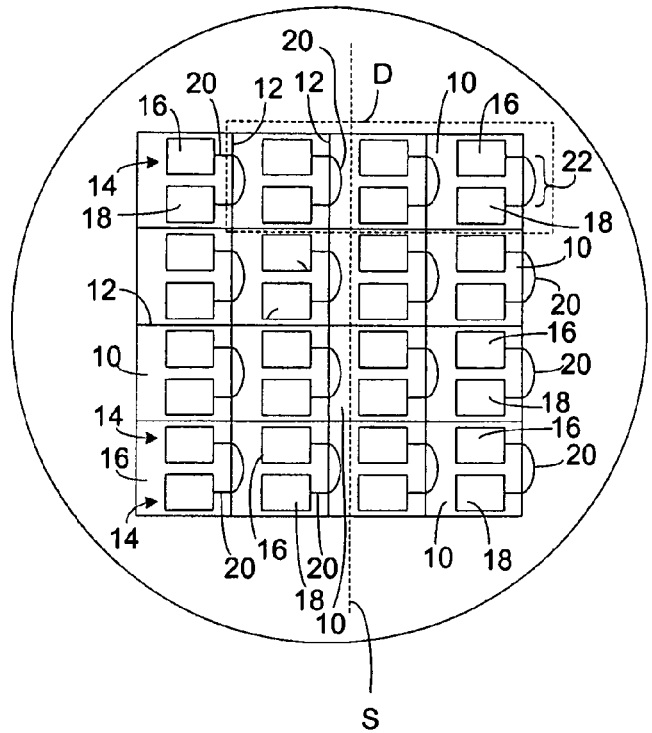
FIG. 1A is a schematic of a wafer that includes optical devices that each includes one or more optical components. A first portion of the optical components on the wafers includes transmitting functionality and a second portion of the optical components on the wafers includes receiving functionality. Testing waveguides each extends across the boundary of a device and provides optical communication between the first portion of the optical components on one of the devices and the second portion of the optical components on the device.

A method of forming optical devices includes generating a wafer that includes several of the same device. The method also includes testing the performance of the devices followed by separating the devices from the wafer. Separating the devices from the wafer includes separating the devices from one another. As a result, the devices can be individually sold, processed further, tested, incorporated into other systems, etc.

Each of the devices includes one or more optical components. A first portion of the optical components include transmitting functionality in that one or more of the components can generate light in response to receiving electrical energy from electronics that are external to the wafer. For instance, the first portion of components can include a light-generating component such as a laser. A second portion of the optical components includes receiving functionality in that they can generates and/or outputs an electrical signal that is a function of the light received by the component. For instance, a second portion of components can include a light sensor such as a photodiode, PIN diode, PN diode, avalanche photodiodes, and light sensors that employ a depletion region.

The wafer also includes testing waveguides. Each testing waveguide provides optical communication between one of the first portions of components and one of the second portions of components. As a result, each testing waveguide provides optical communication between components with transmitting functionality and components with receiving functionality. Electronics that are external to the wafer can be connected to the components so as to operate the components. For instance, the external electronics can operate the light-generating components such that they generate light and the light sensors such that they output an electrical signal that is a function of the level of light received by the light sensor. As a result, the external electronics can use the output of the light sensor to test the performance of the light generating components and the light sensors. Additionally, the first portion of components and/or the second portion of components on a device can include active and/or passive components in addition to the light generating components and light sensors. Because the light generated by the one or more light-generating components on a device is also processed by these additional components, the output of the one or more light sensors on a device also indicates the performance of these additional components. As a result, the performance of these components can also be tested before the devices are separated from the wafer.

Each testing waveguides extends from the first portion of optical components on a device across the perimeter of the device. Accordingly, a portion of the testing waveguide that was connected to one or more components on a device is located on another device or on a portion of the wafer outside of the device. As a result, the testing waveguides are split when the devices are separated from the wafer. Accordingly, the communication that each testing waveguide originally provides between one or more light-generating components and one or more light sensors is severed upon separation of the devices from the wafer. The portion of the testing waveguide that remains on a device can serve as the input and/or output waveguides for that device. As a result, the testing waveguides originally provide the optical communication needed for testing the components, but portions of the same waveguides later serve as input and/or output waveguides.

FIG. 1A is a schematic of a wafer that includes optical devices 10. At least a portion of the devices on the wafer are the same device. In some instances, all of the devices on the wafer are the same in order to reduce the number of steps required during fabrication of the wafer. After formation of the devices on the wafer, the optical devices 10 are separated from the wafer so they are independent of each other. Separating the devices from the wafer includes separating them from one another. As a result, the lines 12 on FIG. 1A that illustrate the boundary or perimeter of adjacent devices can represent lines along which the devices are separated from one another and accordingly from the wafer.

The optical devices 10 each includes one or more optical components 14. Examples of suitable optical components include, but are not limited to, facets through which light signals can enter and/or exit a waveguide, a taper for changing the mode size of a light signal guide by the waveguide, entry/exit ports through which light signals can enter and/or exit a waveguide from above or below the device, multiplexers for combining multiple light signals onto a single waveguide, demultiplexers for separating multiple light signals such that different light signals are received on different waveguides, optical couplers, optical switches, lasers that act a source of a light signal, light sensors such as sensors that convert all or a portion of the light signal to an electrical signal, amplifiers for amplifying the intensity of a light signal, attenuators for attenuating the intensity of a light signal, modulators for modulating a signal onto a light signal, modulators that convert a light signal to an electrical signal, and vias that provide an optical pathway from the bottom side of a device to the top side of the device. Although not illustrated, the devices can optionally include electrical devices.

One or more of the optical components 14 can include electrical components. For instance, the optical components can include contact pads (not shown) for making electrical contact with electronics that are external to the device. As an example, a laser can include contact pads that are to be electrically connected to laser driving electronics that are external to the device. Other optical components that may include contact pads for operating the component include, but are not limited to, light sensors, modulators, amplifiers, attenuators, polarizers, polarization splitters, and heaters.

A first portion 16 of the optical components 14 on the devices have a transmitting functionality. For instance, the first portion 16 of the optical components 14 include one or more light-generating components that each generates light in response to application of electrical energy to the light-generating component. The electrical energy can be applied from electronics that are external to the wafer. An example of a light-generating components includes, but is not limited to, a distributed feedback (DFB) laser, a Fabrty-Perot (FP) laser, an RSOA (reflection semiconducting optical amplifier), and a Ge laser.

A second portion 18 of the optical components 14 included on the devices have a receiving functionality. For instance, the second portion 18 of the optical components 14 include one or more receiver components that are each configured to output an electrical signal that is a function of the light received by the receiver component. For instance, the receiver components can output an electrical signal that indicates the reception and/or intensity of light received by the receiver component. In some instances, the receiver components are operated by electronics that are external to the wafer. In some embodiments of the receiver component, the electronics apply a forward bias and/or reverse bias to the receiver component and the receipt of light by the receiver component changes the flow of electrical current through the receiver component. The electrical signal that exhibits the change in electrical current serves as the electrical signal output by the receiver component or generated by the optical component. Suitable examples of receiver components that are configured output an electrical signal that indicates receipt of light, but are not limited to, photodiodes, PIN diodes, PN diodes, avalanche photodiodes, and light sensors that employ a depletion region.

Figure 1B:
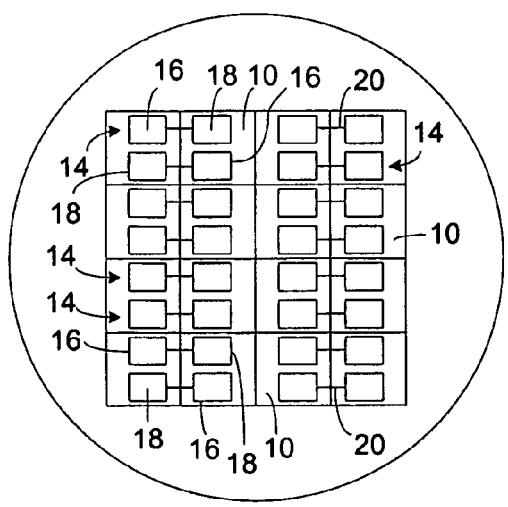
FIG. 1B is a schematic of a wafer where the optical devices each includes the first portion of optical components and the second portion of optical components. Testing waveguides each provides optical communication between a first portion of the optical components on one of the devices and a second portion of the optical components located on another one of the devices.
Figure 1C:
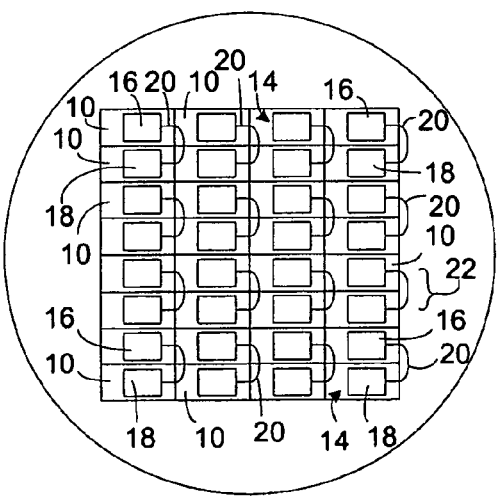
FIG. 1C is a schematic of a wafer. Testing waveguides each provides optical communication between a first portion of the optical components on one of the devices and a second portion of the optical components located on another one of the devices.

The wafer includes one or more testing waveguides 20. Each of the testing waveguides 20 provides optical communication between the first portion 16 of the optical components 14 on one of the devices and the second portion 18 of the optical components 14 on one of the devices. Although FIG. 1A shows the testing waveguides 20 providing optical communication between the first portion 16 of components 14 and the second portion 18 of components 14 on the same device, the one or more testing waveguides 20 can provide optical communication between the first portion 16 of components 14 on one of the devices and the second portion 18 of components 14 on another device as shown in FIG. 1B. Additionally, each device need not have both transmitting functionality and receiving functionality. For instance, the testing waveguides 20 can provide optical communication between devices having transmitting functionality and devices having receiving functionality as shown in FIG. 1C.

The testing waveguides 20 each extends from the first portion 16 of the components 14 on one of the devices to a location that is outside of the device. Additionally, the testing waveguides 20 each extends from outside of one of the devices to the second portion 18 of the components 14 on the device. Accordingly, each of the testing waveguides 20 extends across the boundary or perimeter of the device with which the testing waveguide 20 is in optical communication. As a result, separating the devices from the wafer causes the testing waveguides 20 to be split. For instance, a sacrificial portion 22 of each testing waveguide 20 is separated from the devices upon separation of the devices from the wafer. However, as is evident from FIG. 1A, the separation of the devices from the wafer leaves the sacrificial portion of the testing waveguides 20 on at least some of the devices. In some instances, it may be desirable to remove the sacrificial portion 22 of the testing waveguide 20 from all or a portion of the devices. For instance, it may be desirable to separate the sacrificial portion 22 of the testing waveguide 20 from all or a portion of the devices. As a result, separating the devices from the wafer can optionally include separating the devices along lines such as the line labeled S in FIG. 1A. This additional separation provides devices that exclude sacrificial portions 22 of the testing waveguides 20. This separation can be done using methods such as dicing, cleaving, and etching.

Because the testing waveguides 20 provide optical communication between components 14 that include one or more light-generating components and components that include one or more receiver components, the performance of the components can be tested before the devices are separated from the wafer. For instance, external electronics (not shown) can be connected to the contact pads on the wafer such that the external electronics can operate various components on the devices. In particular, the external electronics can be connected to the wafer so as to operate the light-generating components and the receiver components. The external electronics can use the one or more receiver components to test for the presence and/or intensity of light being produced by the one or more light-generating components. When the first portion 16 of components and the second portion 18 of components include components in addition to the one or more receiver components and the one or more light-generating components, the performance of these components can also be tested. For instance, when the first portion 16 of components and/or the second portion 18 of components on a device includes one or more modulators, the external electronics can also be configured to operate the one or more modulators. The output from the one or more receiver components on the device can be monitored while operating the one or more modulators and the one or more light-generating components. In this instance, the output of the one or more receiver components indicates the performance level of the one or more modulators.

Using the above testing methods, devices that fail the testing procedures can be identified. For instance, light-generating components that fail to generate light or fail to generate sufficiently intense light can be identified. When the number of devices on a wafer that have components failing the testing procedures exceeds a threshold, the entire wafer can be discarded without separating the devices from the wafer. Alternately, devices that are identified as failing the testing procedures need not be separated from the wafer while the device that pass the testing procedures can be separated from the wafer. As a result, the ability to test these devices while still on the wafer reduces the need for further processing of failed devices.

Figure 2A:
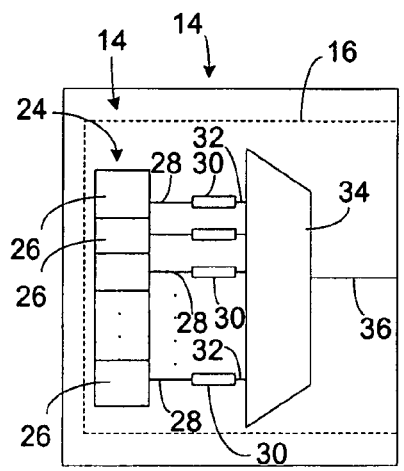
FIG. 2A is a schematic of a device that has transmitting functionality.

FIG. 2A is an example of a device that has transmitting functionality. The device has a first portion 16 of optical components that include a laser array 24. The laser array 24 includes multiple light-generating components 26. In particular, FIG. 2A is schematic of a transmitter that includes a laser array 24 that outputs several laser signals that are each at a different wavelength. The device also includes laser waveguides 28 that each receives one of the laser signals such that different laser waveguides 28 each receives a laser signal of a different wavelength. Each laser waveguide 28 guides the received laser signal to a modulator 30. The modulators 30 are configured to be in electrical communication with external electronics (not shown). The external electronics can operate each modulator 30 such that the received laser signal is modulated into a modulated light signal. The modulated light signals are each received on a modulator waveguide 32 that guides the received modulated light signals to a multiplexer 34 that combines the modulated light signals into an output signal that is received on an output waveguide 36. The output waveguide 36 guides the output signal to a facet through which the output signal exits from the device. Suitable multiplexers 34 include, but are not limited to, arrayed waveguide gratings, echelle gratings, y-junction combiners, multi-mode interference (MMI) couplers, and star couplers.

Figure 2B:
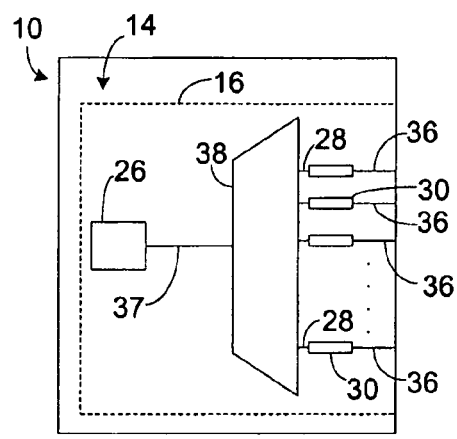
FIG. 2B is another schematic of a device that has transmitting functionality.

FIG. 2B is an example of another device that has transmitting functionality and operates as a transmitter. The device has a first portion 16 of optical components that include a laser that serves as a light-generating component 26. The device also includes a splitter waveguide 37 that receives the light output from the laser and guides that output to a splitter 38. The splitter 28 splits the received laser signal into multiple laser signals. The transmitter includes several laser waveguides 28 that each receives a different one of the laser signals. Each laser waveguide 28 guides the received laser signal to a modulator 30. The modulators 30 are in electrical communication with electronics (not shown). The electronics are configured to operate each modulator 30 such that the received laser signal is modulated into an output light signal. The output light signals are each received on an output waveguide 36 that guides the received output light signal to a facet through which the output signal exits from the device.

The splitter 28 can be a wavelength dependent splitter such as a demultiplexer but need not operate as a demultiplexer. For instance, the splitter 28 can be a wavelength independent splitter. As a result, each of the laser signals can include substantially the same selection of wavelengths. Suitable wavelength independent splitters include, but are not limited to, y-junctions, MMIs, and star couplers.

Figure 3A:
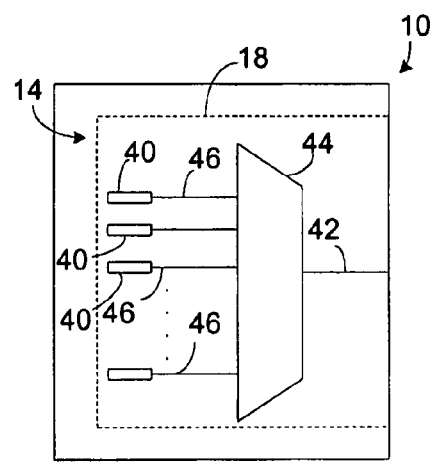
FIG. 3A is a schematic of a device that has receiving functionality.

FIG. 3A is schematic of a device that has receiving functionality. The device has a second portion 18 of optical components that include light sensors 40. The light sensors 40 serve as receiver components. The device shown in FIG. 3A is receiver that is suitable for testing at the wafer level. The receiver includes an input waveguide 42 that receives an input light signal. The input waveguide 42 guides the input signal to a demultiplexer 44 that demultiplexes the input signal into sensor signals. The sensor signals are each received on a sensor waveguide 46. Each of the sensor waveguides 46 guides the received sensor signal to a light sensor 40. The light sensors 40 are each in electrical communication with external electronics (not shown). The external electronics are configured to operate each light sensor 40 such that the light sensor 40 outputs an electrical signal indicating the presence and/or intensity of the sensor signal received by the light sensor 40. In some instances, the receiver electronics are configured to further process the electrical signal output by one or more of the light sensors 40 so as to extract data from the sensor signal. Suitable demultiplexers include, but are not limited to, arrayed waveguide gratings, and echelle gratings.

Figure 3B:
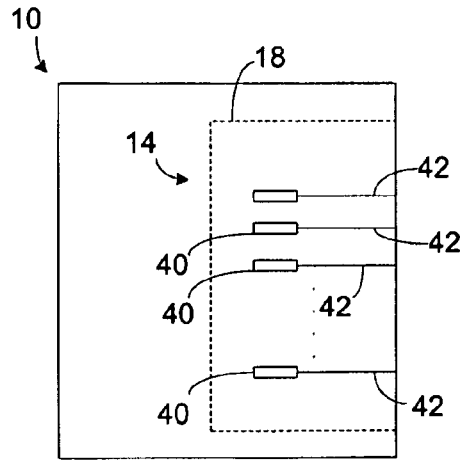
FIG. 3B is another schematic of a device that has receiving functionality.

FIG. 3B is a schematic of another device that has receiving functionality. The device has a second portion 18 of optical components that includes light sensors 40. The light sensors 40 serve as receiver components. The device shown in FIG. 3B is a receiver that is suitable for testing at the wafer level. The receiver includes input waveguides 42 that each receives a different input light signal. Each of the input waveguides 42 guides the received input signal to a light sensor 40. The light sensors 40 are each in electrical communication with receiver electronics (not shown). The receiver electronics are configured to operate each light sensor 40 such that the light sensor 40 outputs an electrical signal indicating the presence and/or intensity of the sensor signal received by the light sensor 40. In some instances, the receiver electronics are configured to further process the electrical signal output by one or more of the light sensors 40 so as to extract data from the sensor signal.

It is often desirable for an optical device to include both transmitting and receiving functionality. These devices are often called transceivers. An optical device that acts as a transceiver and is suitable for wafer level testing can include any combination of the above transmitters and receivers. For instance, FIG. 4A is a schematic of a transceiver that includes the transmitter according to FIG. 2A and a receiver according to FIG. 3A. Alternately, FIG. 4B illustrates a transceiver that includes the transmitter according to FIG. 2B and a receiver according to FIG. 3B.

Figures 5A, 5B:
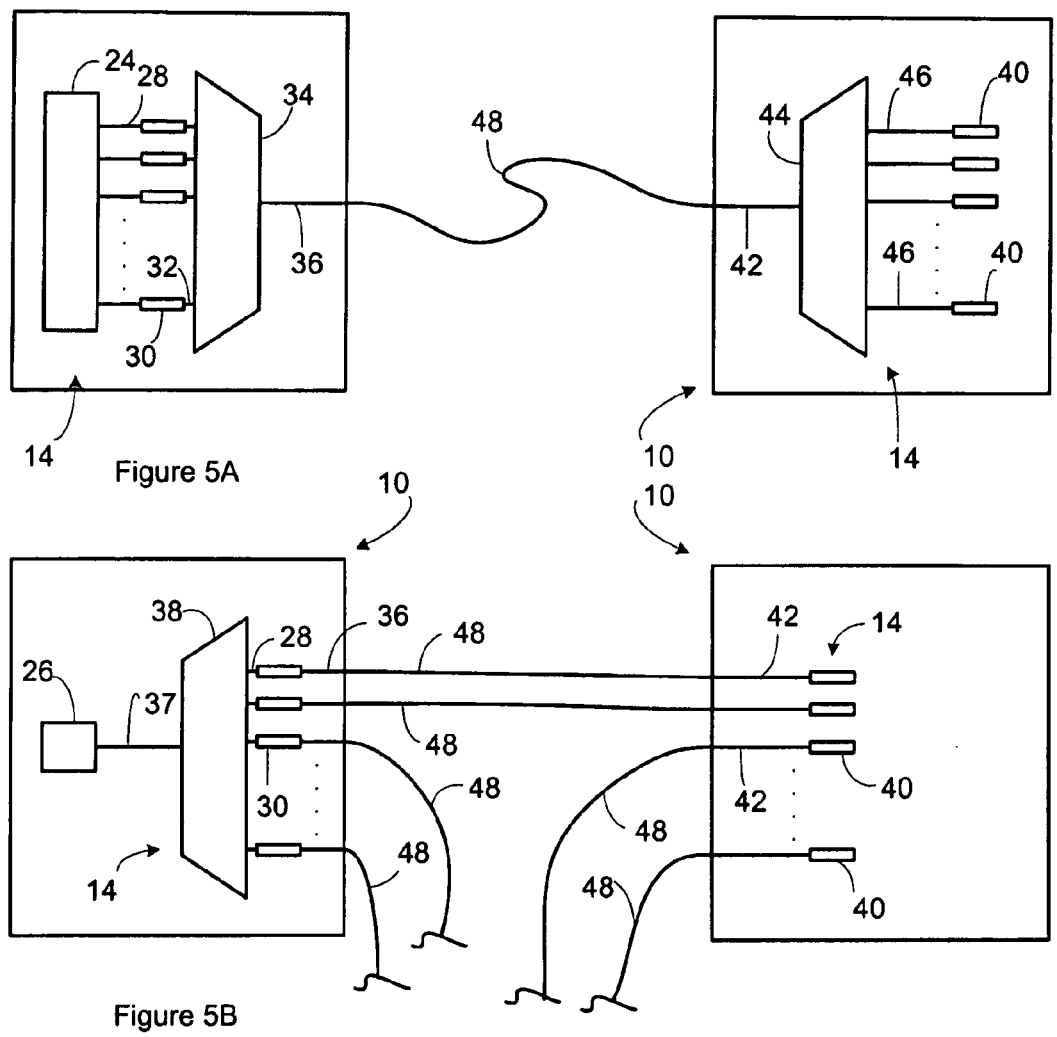
FIG. 5A illustrates a system that includes a transmitter according to FIG. 2A in optical communication with receiver according to FIG. 3A.
FIG. 5B illustrates a system that includes a transmitter according to FIG. 2B to a receiver according to FIG. 3B.

The optical devices of FIG. 2A through FIG. 4B can be interconnected to provide systems that use light signals to communicate. For instance, FIG. 5A illustrates a system that includes a transmitter according to FIG. 2A in optical communication with receiver according to FIG. 3A. The output signal from the transmitter is received at an interdevice waveguide 48 such as an optical fiber. The interdevice waveguide 48 guides the output signal from the transmitter to the receiver. The receiver receives the output signal from the interdevice waveguide 48 and uses it as the input signal discussed in the context of FIG. 3A.

FIG. 5B illustrates another example of a system that interconnects the optical devices of FIG. 2A through FIG. 4B. The system includes one or more interdevice waveguides 48 that each guides an output light signal from a transmitter according to FIG. 2B to a receiver according to FIG. 3B. The receiver receives each of the output signals from the interdevice waveguides 48 on one of the input waveguides 42. The receiver uses each of the output signals as one of the input signals discussed in the context of FIG. 2B.

Although each of the output waveguides 36 in the transmitter of FIG. 4B can be optically linked to one of the input waveguides 42 on the illustrated receiver, each of the output waveguides 36 on the transmitter of FIG. 4B does not need to be optically linked to one of the input waveguides 42. As a result, the transmitter of FIG. 4B is coupled with one or more interdevice waveguides 48 that each guides an output signal to a receiver or other device that is not illustrated in FIG. 4B. Further, the receiver of FIG. 4B is coupled with one or more interdevice waveguides 48 that each guides an input signal from a transmitter or other device that is not illustrated in FIG. 4B.

Figure 5C:
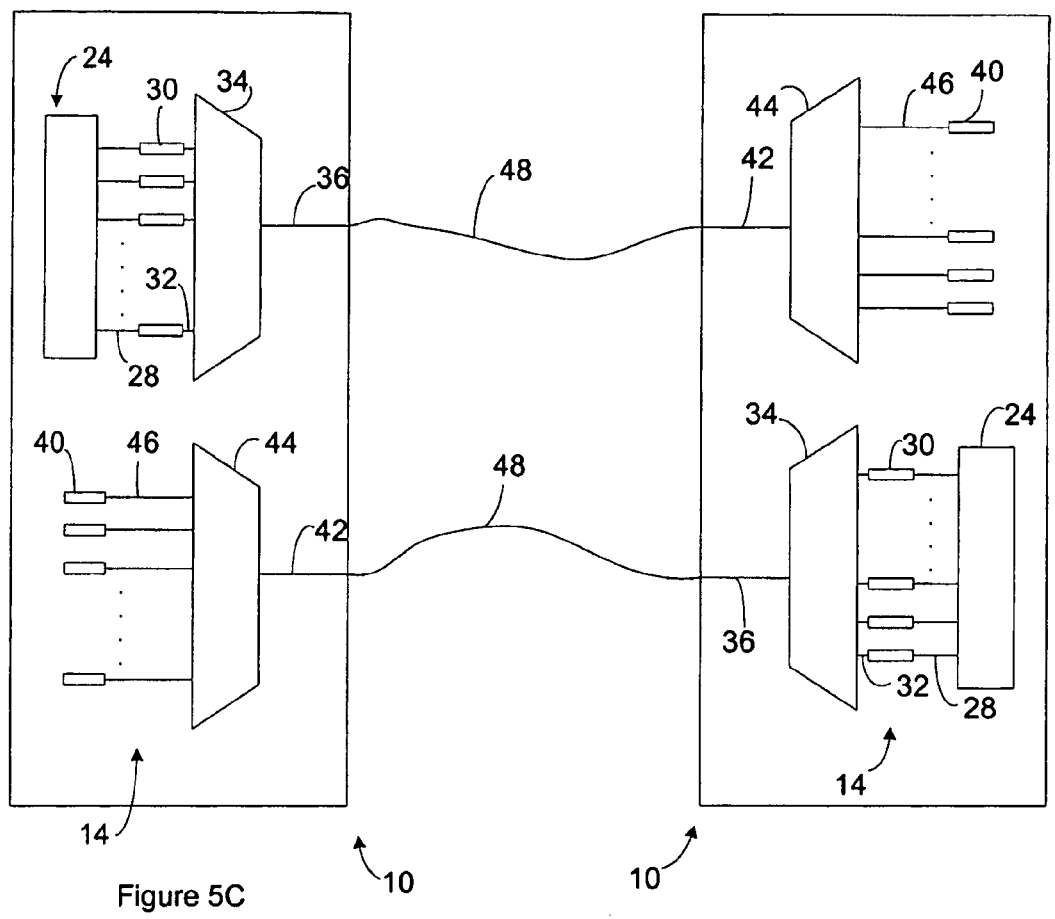
FIG. 5C illustrates a system that includes transceivers according to FIG. 4A in optical communication with one another.

FIG. 5C illustrates another example of a system that interconnects the optical devices of FIG. 2A through FIG. 4B. The system includes two transceivers that are each constructed according to FIG. 4A. A transceiver according to FIG. 4A includes a transmitter according to FIG. 2A and a receiver according to FIG. 3A. The system includes two interdevice waveguides 48 that each guides an output light signal from a transmitter according to FIG. 2A to a receiver according to FIG. 3A. As a result, the interdevice waveguides 48 permit two way communication between the illustrated transceivers. Although the interdevice waveguides 48 shown in FIG. 5C are both shown providing optical communication between the same two transceivers, interdevice waveguides 48 connected to a transceivers can provide optical communication between that transceiver and any combination of other devices such as two other transceivers, a transceiver and a transmitter, a transceiver and a receiver, or a transmitter and a receiver.

The systems illustrated in FIG. 5A through FIG. 5C show examples of uses for the devices illustrated in FIG. 2A through FIG. 4B. Other arrangements of these devices are possible.

FIG. 6A through FIG. 6F illustrates the devices of FIG. 2A through FIG. 5C fabricated on a wafer in a manner that provides for testing of these devices before separation of the devices from the wafer.

Figure 6A:
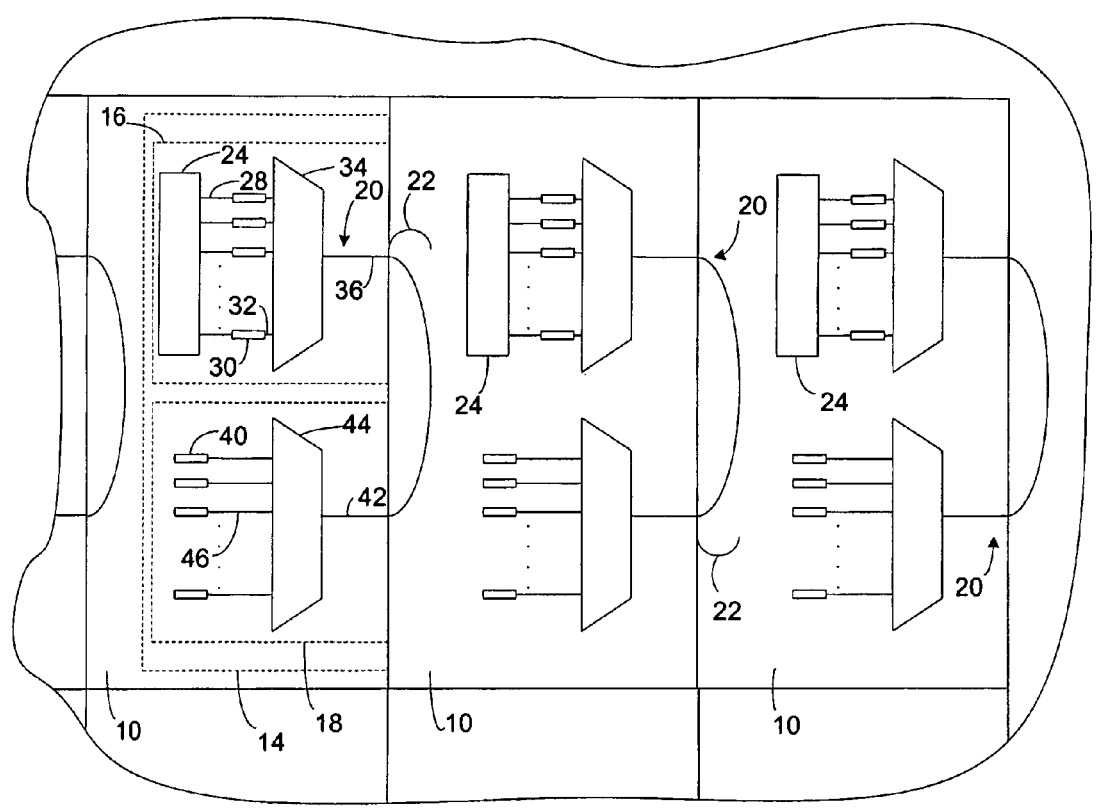
FIG. 6A illustrates a portion of a wafer constructed according to FIG. 1A. The wafer includes multiple transceivers that are each constructed according to FIG. 4A.

FIG. 6A illustrates a portion of a wafer constructed according to FIG. 1A. The wafer includes multiple transceivers that are each constructed according to FIG. 4A. The portion of the wafer illustrated in FIG. 6A can represent the portion of the wafer of FIG. 1A that is within the dashed lines labeled D in FIG. 1A. As noted above, the transceiver according to FIG. 4A includes a transmitter according to FIG. 2A and a receiver according to FIG. 3A. The optical components on the transmitter of FIG. 2A serve as the first portion 16 of the components and the optical components on the receiver of FIG. 3A serve as the second portion 18 of the components.

The testing waveguides 20 extend from an output waveguide 36 of each transmitter to the input waveguide 42 on the receiver of the same device. Accordingly, a portion of each testing waveguide 20 includes an output waveguide 36 of a transmitter and an input waveguide 42 of a receiver. During testing, the external electronics can be connected to the wafer such that the external electronics operate the lasers, modulators 30, and light sensors 40. As a result, the external electronics can test the performance of both the transmitter and the receiver on each of the devices. The ability to test both the transmitter and receiver on a single device allows both devices on a system according to FIG. 5C to be tested before being separated from the wafer.

Figure 6B:
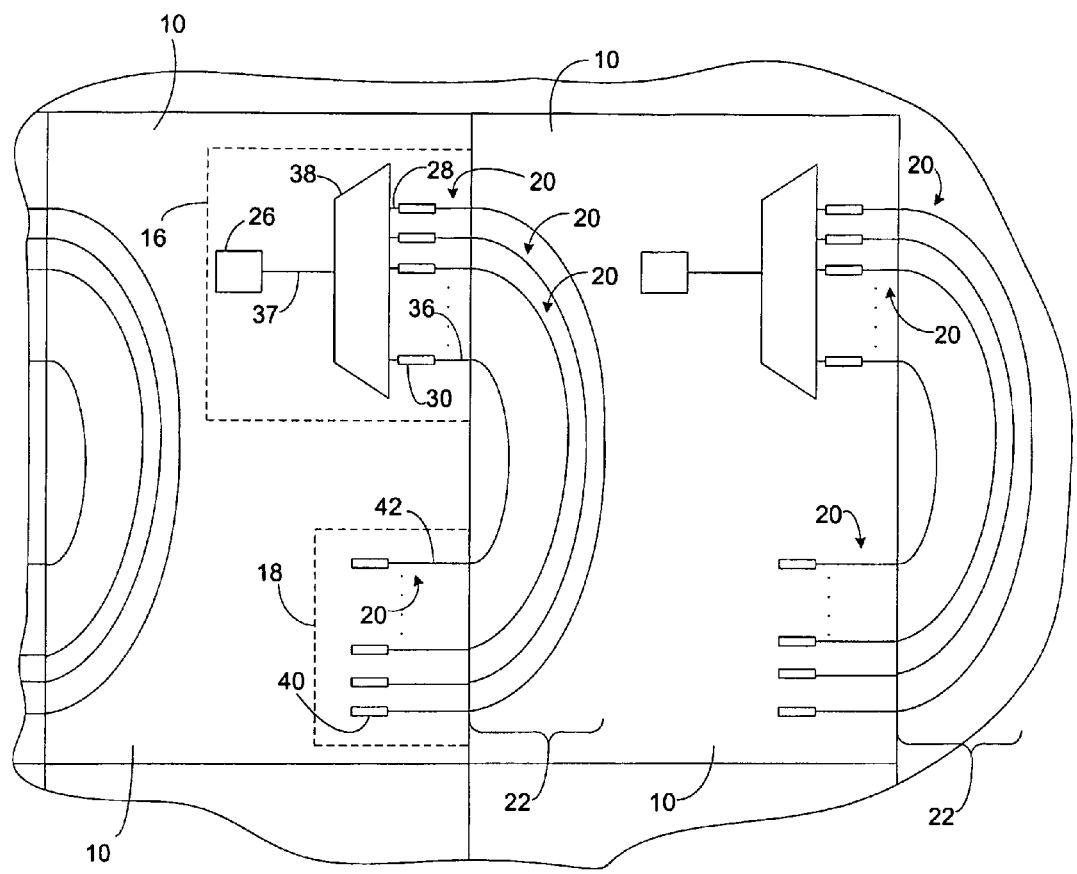
FIG. 6B illustrates a portion of a wafer constructed according to FIG. 1A. The wafer includes multiple transceivers that are each constructed according to FIG. 4B.

FIG. 6B illustrates a portion of a wafer constructed according to FIG. 1A. The wafer includes multiple transceivers that are each constructed according to FIG. 4B. The portion of the wafer illustrated in FIG. 6B schematically illustrates the components for only two of the devices included on the wafer. As noted above, the transceiver according to FIG. 4B includes a transmitter according to FIG. 2B and a receiver according to FIG. 3B. The optical components on the transmitter of FIG. 2B serve as the first portion 16 of the components and the optical components on the receiver of FIG. 3B serve as the second portion 18 of the components.

The testing waveguides 20 extend from an output waveguide 36 of each transmitter to an input waveguide 42 of the receiver on the same device. Accordingly, a portion of each testing waveguide 20 includes an output waveguide 36 of a transmitter and an input waveguide 42 of a receiver. During testing, the external electronics can be connected to the wafer such that the external electronics operate the lasers, modulators 30, and light sensors 40 on each of the devices. As a result, the external electronics can test the performance of both the transmitter and the receiver on each of the devices.

Figure 6C:
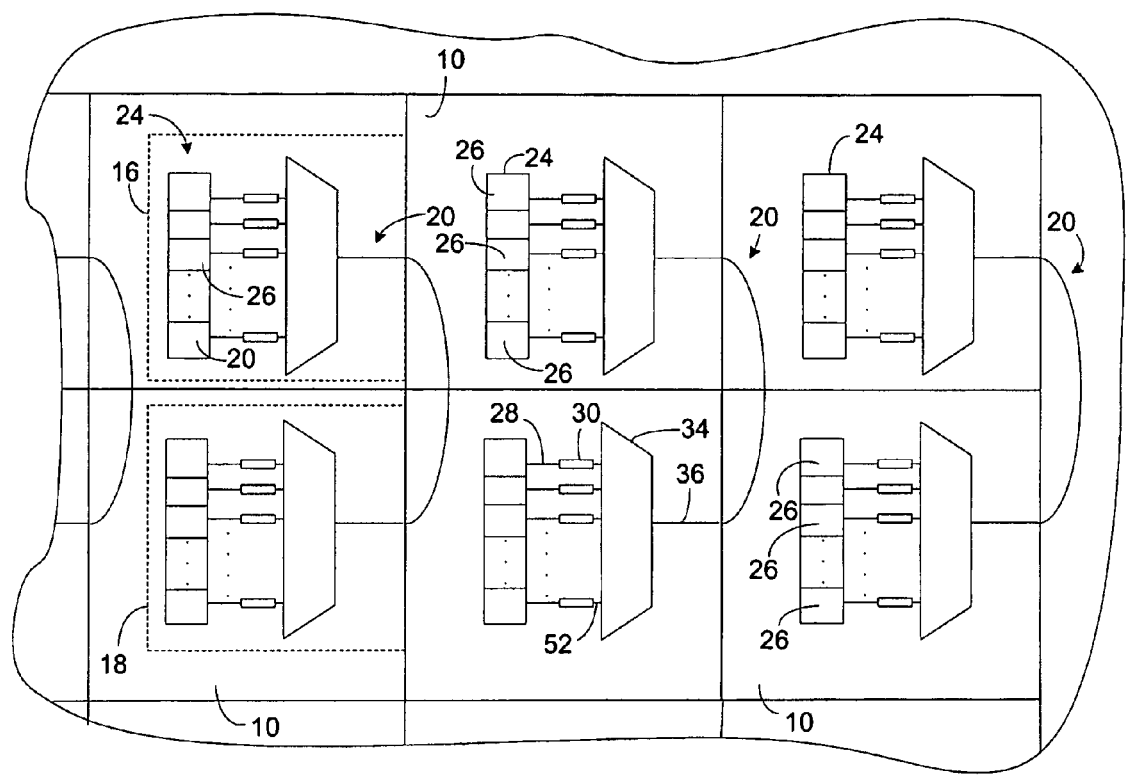
FIG. 6C illustrates a portion of a wafer constructed according to FIG. 1C. The wafer includes transmitters constructed according to FIG. 2A.

Although FIG. 6A and FIG. 6B illustrate transceivers on the wafer, other types of devices can be employed. For instance, FIG. 6C illustrates a portion of a wafer constructed according to FIG. 1C. The illustrated portion of the wafer includes only transmitters constructed according to FIG. 2A. The testing waveguides 20 provide optical communication between the output waveguides 36 of different transmitters and accordingly between different devices. Each of the transmitters includes modulators 30. However, external electronics can operate certain modulators as both a modulator and as a light sensor. Accordingly, the modulators 30 also have receiving functionality in that modulators 30 can output an electrical signal that is a function of the light received by the modulator. As a result, each device can be operated so it includes receiving functionality and/or transmitting functionality.

The external electronics can test the performance of the devices by using the ability of the components on the devices to have receiving functionality and/or transmitting functionality. For instance, the devices can be divided into a first portion 16 of the devices and a second portion 18 of the devices such that each testing waveguide provides optical communication between a device included in the first portion 16 and a device included in the second portion 18. During an earlier stage of the performance testing, the external electronics can operate the light-generating components 26 (lasers) in the first portion 16 of the devices so as to generate light and the modulators 30 in the second portion 18 of the devices as light sensors. During a later stage of the performance testing, the external electronics can operate the light-generating components 26 (lasers) in the second portion 18 of the devices so as to generate light and the modulators 30 in the first portion 16 of the devices as light sensors. When the modulators 30 are to be tested for their modulation ability, the external electronics can operate the light-generating components 26 (lasers) in the first portion 16 of the devices so as to generate light, the modulators 30 in the first portion 16 of the devices as modulators, and the modulators 30 in the second portion 18 of the devices as light sensors during the earlier stage of testing and then the external electronics can operate the light-generating components 26 (lasers) in the second portion 18 of the devices so as to generate light, the modulators 30 in the second portion 18 of the devices as modulators, and the modulators 30 in the first portion 16 of the devices as light sensors during the later stage of testing.

Figure 6D:
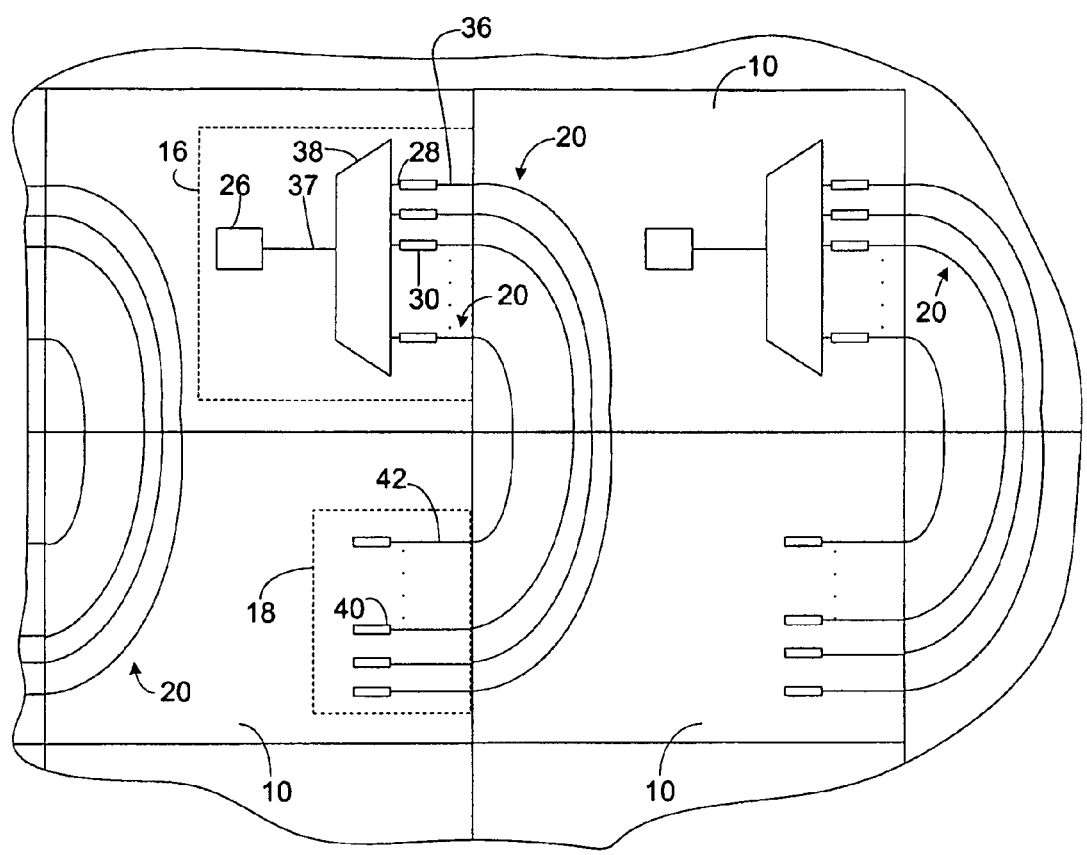
FIG. 6D illustrates the wafer of FIG. 6A further divided into transmitters and receivers to provide a wafer according to FIG. 1C.

The devices on the wafer need not all be the same device. For instance, FIG. 6D illustrates the wafer of FIG. 6A further divided into transmitters and receivers to provide a wafer according to FIG. 1C. Accordingly, separating the devices from the wafer of FIG. 6D yields both transmitters and receivers that are independent from one another. Since the testing waveguides 20 provide optical communication between optical components having transmitting functionality and receiving functionality, the external electronics can test the performance of both the transmitters and the receivers on the wafer.

Figure 6E:
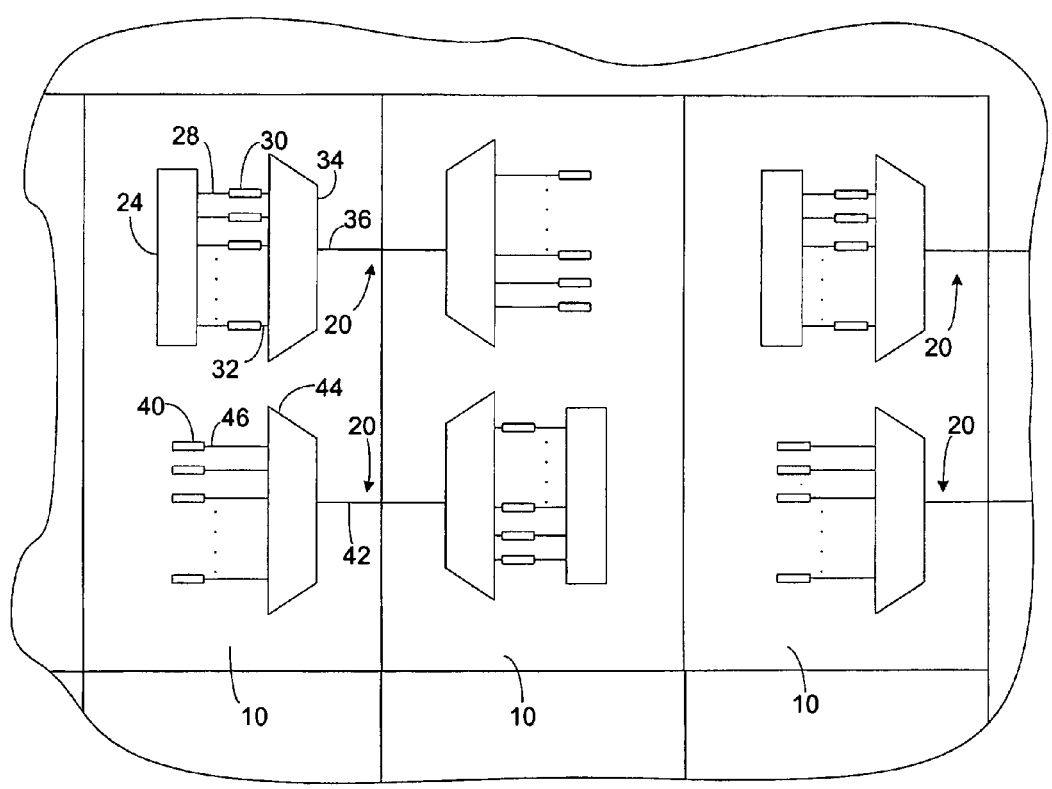
FIG. 6E illustrates a portion of a wafer constructed according to FIG. 1B. The wafer includes multiple transceivers that are each constructed according to FIG. 4A.

FIG. 6E illustrates a portion of a wafer constructed according to FIG. 1B. The wafer includes multiple transceivers that are each constructed according to FIG. 4A. Accordingly, each device includes a transmitter and a receiver. Testing waveguides 20 provide optical communication between a transmitter on a first optical device and a receiver on a second optical device. Additionally, testing waveguides 20 provide optical communication between a transmitter on the second optical device and a receiver on the first optical device.

Figure 6F:
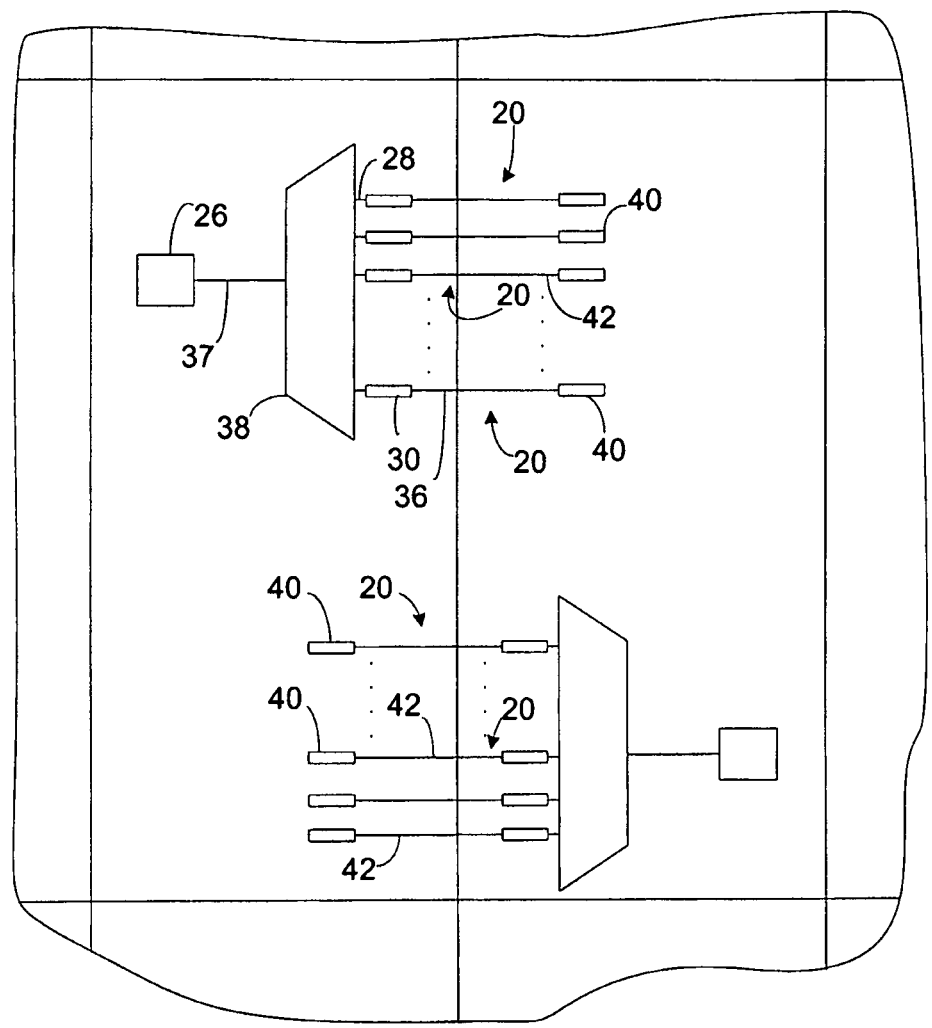
FIG. 6F illustrates a portion of a wafer constructed according to FIG. 1B. The wafer includes multiple transceivers that are each constructed according to FIG. 4B.

FIG. 6F illustrates a portion of a wafer constructed according to FIG. 1B. The wafer includes multiple transceivers that are each constructed according to FIG. 4B. Accordingly, each device includes a transmitter and a receiver. Testing waveguides 20 provide optical communication between a transmitter on a first optical device and a receiver on a second optical device. Additionally, testing waveguides 20 provide optical communication between a transmitter on the second optical device and a receiver on the first optical device.

In the wafers illustrated in FIG. 6A through FIG. 6F, each of the testing waveguides 20 provides optical communication between optical components that include one or more light generating components 26 and optical components that include one or more light sensors 40. The testing waveguides 20 allow the light generated at the one or more light generating components 26 to be received by one or more of the light sensors 40. For instance, if the testing waveguides 20 were absent or severed, the one or more light sensors 40 would not receive light generated at the one or more light-generating components 26 associated with the light sensor 40.

Since the light generated at one or more light-generating components 26 is received at a light sensor 40, the output of the light sensor 40 can be used to test the ability of the light-generating components 26 to generate light as well as the ability of the light sensor 40 to detect that light. Further, as is evident from each of FIG. 6A through FIG. 6E, other optical components can be optically between a light-generating component 26 and a light sensor 40. For instance, FIG. 6A shows modulators 30, multiplexers 34, and demultiplexers 44 positioned between light sensors 40 and light-generating components 26. FIG. 6B shows splitters 38 and modulators 30 positioned between light sensors 40 and light-generating components 26.

Optical components such as splitters, multiplexers, and demultiplexers may be considered passive in that they do not need to be operated by external electronics in order to perform their intended function. However, the performance of these passive components is also indicated by the output of the light sensors 40. For instance, if a demultiplexer 44 in a device according to FIG. 3A does not direct the different input signals to the correct sensor waveguides 46, the output of a light sensor 40 that is to receive light from that demultiplexer will show an undesirably low intensity of light. As a result, the output of the light sensors 40 can also be used to test the performance of passive optical components that are optically between a light-generating component 26 and a light sensor 40.

Optical components such as modulators can be classified as active components because they need to be operated by external electronics in order to perform their intended function. The performance of these components can also be determined from the output of the light sensors 40. For instance, the external electronics can operate a modulator so as to modulate a laser signal into a modulated signal. If a modulator does not provide the desired performance level, the output of the light sensor 40 that receives the modulated light signal will not show the desired degree of modulation and the device having that modulator can be discarded. As a result, the output of the light sensors 40 can also be used to test the performance of active optical components that are optically between a light-generating component 26 and a light sensor 40.

In FIG. 6A through FIG. 6F, the testing waveguides 20 have a similar function to the interdevice waveguides 48 in the systems of FIG. 5A through FIG. 5C. For instance, interdevice waveguides 48 in the systems of FIG. 5A and FIG. 5C provide optical communication between a transmitter according to FIG. 2A and a receiver according to FIG. 3A. Similarly, testing waveguides 20 on the wafers of in FIG. 6A, FIG. 6C and FIG. 6E also provide optical communication between a transmitter according to FIG. 2A and a receiver according to FIG. 3A. As a result, the ability of the devices on the wafers of in FIG. 6A, FIG. 6C and FIG. 6E to perform in the systems of FIG. 5A or FIG. 5C can be tested before the devices are separated from the wafer. Further, interdevice waveguides 48 in the systems of FIG. 5B provide optical communication between a transmitter according to FIG. 2B and a receiver according to FIG. 3B. Similarly, testing waveguides 20 on the wafers of in FIG. 6B and FIG. 6D also provide optical communication between a transmitter according to FIG. 2B and a receiver according to FIG. 3B. As a result, the ability of the devices on the wafers of in FIG. 6B and FIG. 6D to perform in the system of FIG. 5B can be tested before the devices are separated from the wafer.

Figure 7:
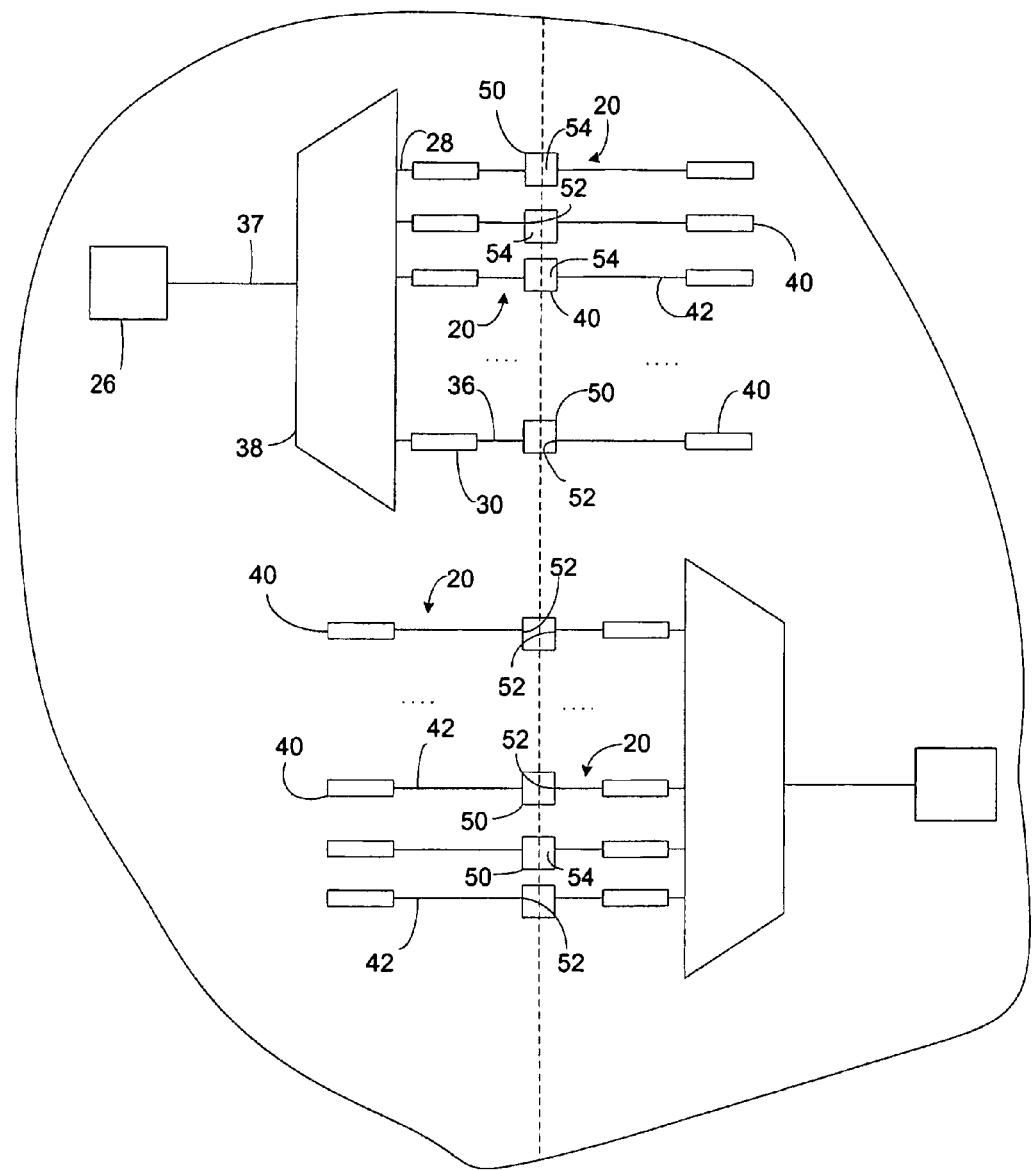
FIG. 7 is a topview of a portion of the wafer shown in FIG. 6F modified to include facet recesses.

As noted above, the devices on the wafer can be separated using techniques such as dicing, cleaving, and etching. When the devices are diced and/or cleaved from the wafer, the resulting facets can be polished in order to provide the desired level of smoothness. However, the facets can be formed before separating the optical components. For instance, the facets can be formed as a results of etching the wafer so as to form a facet recess positioned between devices. As an example, FIG. 7 is a topview of a portion of the wafer shown in FIG. 6F modified to include multiple facet recesses 50. Testing waveguides 20 provide optical communication between a transmitter on a first optical device and a facet recess 50. Testing waveguides 20 also provide optical communication between a facet recess 50 and a receiver on the first optical device. Additionally, testing waveguides 20 provide optical communication between a transmitter on the second optical device and a facet recess 50. Further, testing waveguides 20 also provide optical communication between a facet recess 50 and a receiver on the second optical device.

Each of the testing waveguides 20 ends at a facet 52 positioned on a side of one of the facet recesses 50. Each of the facet recesses 50 is filled with a medium 54 that transmits light. The medium 54 can be a solid or gas such as air. During testing of the devices, the light signals being guided through the testing waveguide exit from a testing waveguide through one of the facets 52, travels through the medium in the facet recess 50, and enters the testing waveguide on the opposing side of the facet recess 50 through the associated facet 52. As a result, the testing waveguides 20 provides optical communication between optical components that include one or more light generating components 26 and optical components that include one or more light sensors 40. Accordingly, even though the facets 52 are formed before separation of the devices, the devices can still be tested before separation of the optical devices. After testing, the optical devices can be separated along the dashed line in FIG. 7. When techniques such as dicing or cleaving are used to separate the devices, the facets 52 should be sufficiently far apart that the devices can be separated without damaging the facets. For instance, in some instances the facets are sufficiently far apart to accommodate a blade between the facets. In some instances, a suitable separation between the facets is at least 20 μm.

Although the facet recess 50 is shown above in conjunction with the wafer of FIG. 6F, the facet recess can be employed in conjunction with any of the disclosed wafers and/or devices.

Testing of the optical devices before separation from one another and/or the wafer can include testing whether a link between a light generating components and a light sensor is functional. For instance, the testing can include a determination of whether light is emitted by a laser is received at the appropriate light sensor with the desired level of intensity. Accordingly, a link can be tested by applying a particular level of power to one or more of the light generating component and monitoring the output of one or more light sensor to determine if each of the monitored light sensors is receiving a light signal with a level of power above a test threshold. In the event that one or more of the light sensors receives the light signal with a power level below the test threshold, the device or devices having the light generating component and light sensor can be considered to have failed the testing and can be discarded or can be tested further.

When the devices include active devices, the performance of those active devices can also be tested. For instance, once a link is determined to be operational, a particular level of power can be applied to one or more of the light generating components, the output of one or more light sensors monitored, and one or more of the active components can be operated. The changes to the output of the one or more light sensors during the operation of the one or more active components indicates whether the one or more active components is functioning as intended. For instance, when a modulator serves as an active component that is being tested, the output of one or more light sensors should indicate that the received light signal is being modulated. For instance, operation of the modulator should cause the received light signal to have an intensity that varies from above an upper threshold to below a lower threshold. In the event that that output of one or more light sensors indicates that modulation is failing to cause the light signal to fall below the lower threshold, then the device having that modulator can be consider to have failed the testing and can be discard or can be tested further. Accordingly, the testing of active components can also include monitoring the output of one or more light sensors to determine if the intensity of the received light is above a target threshold and/or below a target threshold.

The below disclosure discusses methods and structures that can be employed to generate the devices, components, and/or wafers disclosed above. When these techniques are employed to generate the devices, components, and/or wafers disclosed above, the following are examples of possible testing standards. When a wafer is constructed according to FIG. 6A, a laser on a device is driven at 50 mA, and the associated modulator is biased at 2V, the link to the associated light sensor is considered to have failed if the current through the associated light is less than 150 mA. When a wafer is constructed according to FIG. 6B, there are eight laser signals at different wavelengths, a laser on a device is driven at 50 mA, and the associated modulator is biased at 2V, the link to the associated light sensor is considered to have failed if the current through the associated light is less than 80 mA. When a wafer is constructed according to FIG. 6C, a laser on a device is driven at 50 mA, and the associated modulator is biased at 2V, the link to the associated light sensor is considered to have failed if the current through the associated light is less than 100 mA. When a wafer is constructed according to FIG. 6E, a laser on a device is driven at 50 mA, and the associated modulator is biased at 2V, the link to the associated light sensor is considered to have failed if the current through the associated light is less than 150 mA.

Figure 8A:
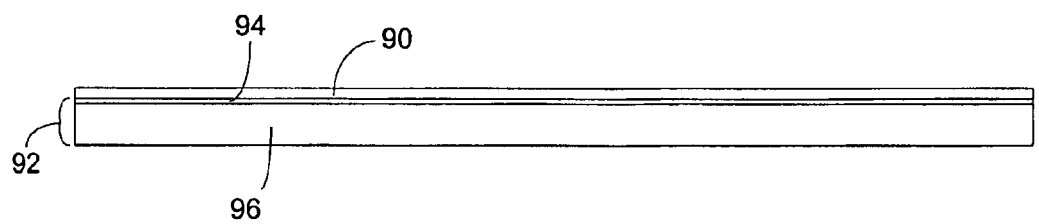
FIG. 8A illustrates a wafer suitable for construction of optical devices that can be tested before being separated from the wafer.

Suitable wafers for fabricating optical devices that are to be separated from the wafer after testing includes, but are not limited to, wafers having a light-transmitting medium 90 on a base 92. In some instances, the base 92 includes an optical insulator 94 on a substrate 96. An example of such a wafer is a silicon-on-insulator wafer. FIG. 8A illustrates a cross-section of a silicon-on-insulator wafer. The silicon-on-insulator wafer includes a layer of silicon that serves as the light-transmitting medium 90. The silicon-on-insulator wafer also includes a layer of silica positioned between a silicon substrate and the layer of silicon that serves as the light-transmitting medium 90. The silicon substrate serves as the substrate 96 and the silica silica serves as the optical insulator 94.

Figure 8B:
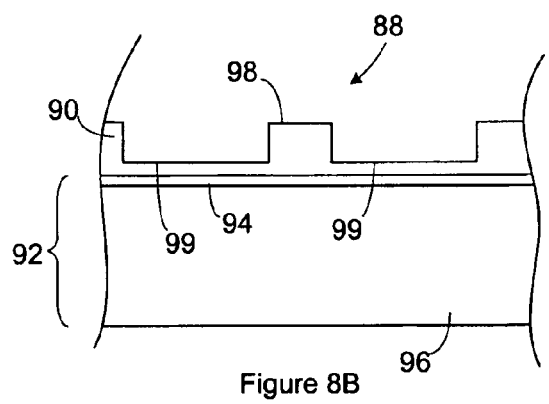
FIG. 8B is a cross-section of a ridge waveguide suitable for formation on a wafer constructed according to FIG. 8A.

The waveguides fabricated on silicon-on-insulator wafers are typically ridge waveguides or rib waveguides. FIG. 8B is a cross-section of a ridge waveguide 88 suitable for formation on a silicon-on-insulator wafer. The waveguide 88 is defined in the light-transmitting medium 90. For instance, a portion of the waveguide 88 is partially defined by the ridge 98 extending upward from a slab region 99 of the light-transmitting medium 90. In some instances, the top of the slab region 99 is defined by the bottom of trenches extending partially into the light-transmitting medium 90 or through the light-transmitting medium 90. The portion of the base 92 adjacent to the light-transmitting medium 90 reflects light signals from the waveguide 88 back into the waveguide 88 in order to constrain light signals in the waveguide 88. For instance, a drop in index of refraction from the light-transmitting medium 90 to the base 92 allows the base 92 to act as a light insulator 94 that reflects light being guided by the waveguide 88 back into the waveguide 88. In the case of a silicon-on-insulator wafer, the drop in index of refraction from the silicon to the silica allows the silica to act as a light insulator 94

The above waveguide 88 can be constructed according to FIG. 8B. For instance, the input waveguides 42, output waveguides 36, testing waveguides 20, laser waveguides 28, modulator waveguides 32, sensor waveguides 46 can be constructed to have a cross section according to FIG. 8B.

Figure 9:
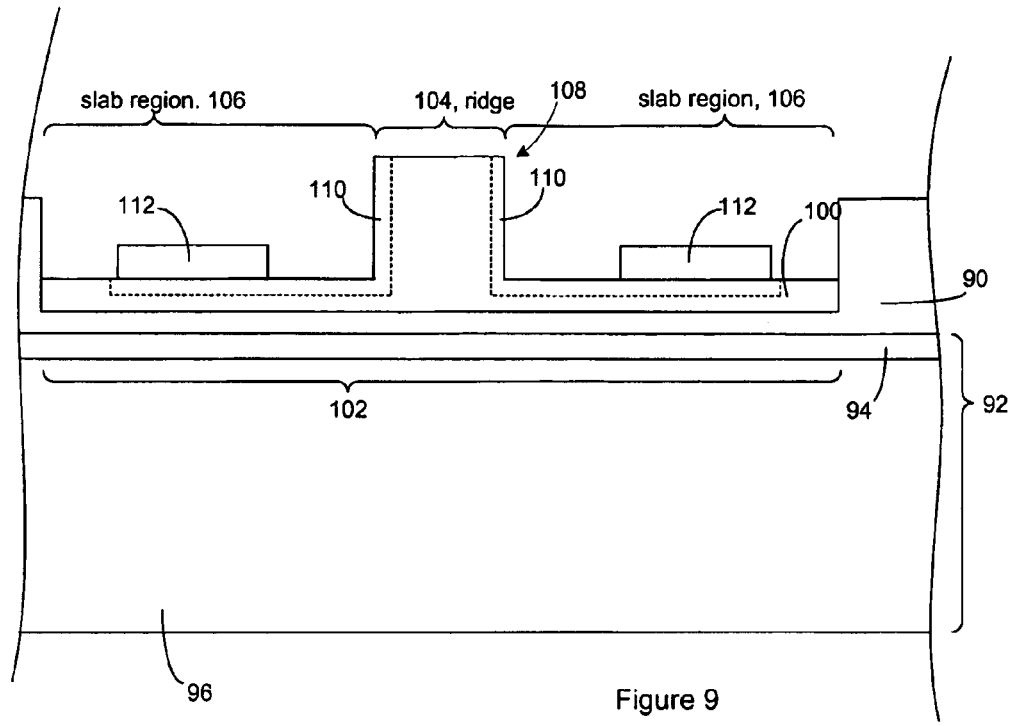
FIG. 9 is a cross section of a optical component that can be operated as a modulator and/or light sensor.

As discussed above, the optical components on a device can include or consist of a light sensor and/or modulator. FIG. 9 is a cross section of a component that can be formed on a wafer constructed according to FIG. 8A and FIG. 8B. The components of FIG. 9 can be operated as a modulator and, in some instances, as a light sensor. An active medium 100 is positioned on the base 92. In particular, the active medium 100 is positioned on a seed portion 102 of the light-transmitting medium 90. A ridge 104 of the active medium 100 extends upward from a slab region 106 of the active medium 100 and defines a component waveguide 108 through the active component.

Doped regions 110 are both in the slab regions 106 of the active medium 100 and also in the ridge 104 of the active medium 100. For instance, doped regions 110 of the active medium 100 are positioned on the lateral sides of the ridge 104 of the active medium 100. In some instances, each of the doped regions 110 extends up to the topside of the active medium 100 as shown in FIG. 9. Additionally, the doped regions 110 extend away from the ridge 104 into the slab region 106 of the active medium 100. The transition of a doped region 110 from the ridge 104 of the active medium 100 into the slab region 106 of the active medium 100 can be continuous and unbroken as shown in FIG. 9.

Each of the doped regions 110 can be an N-type doped region 110 or a P-type doped region 110. For instance, each of the N-type doped regions 110 can include an N-type dopant and each of the P-type doped regions 110 can include a P-type dopant. In some instances, the active medium 100 includes a doped region 110 that is an N-type doped region 110 and a doped region 110 that is a P-type doped region 110. The separation between the doped regions 110 in the active medium 100 results in the formation of PIN (p-type region-insulator-n-type region) junction in the modulator.

In the active medium 100, suitable dopants for N-type regions include, but are not limited to, phosphorus and/or arsenic. Suitable dopants for P-type regions include, but are not limited to, boron. The doped regions 110 are doped so as to be electrically conducting. A suitable concentration for the P-type dopant in a P-type doped region 110 includes, but is not limited to, concentrations greater than $1\times10^{15}$ cm$^{-3}$, $1\times10^{17}$ cm$^{-3}$, or $1\times10^{19}$ cm$^{-3}$, and/or less than $1\times10^{17}$ cm$^{-3}$, $1\times10^{19}$ cm$^{-3}$, or $1\times10^{21}$ cm$^{-3}$. A suitable concentration for the N-type dopant in an N-type doped region 110 includes, but is not limited to, concentrations greater than $1\times10^{15}$ cm$^{-3}$, $1\times10^{17}$ cm$^{-3}$, or $1\times10^{19}$ cm$^{-3}$, and/or less than $1\times10^{17}$ cm$^{-3}$, $1\times10^{19}$ cm$^{-3}$, or $1\times10^{21}$ cm$^{-3}$.

Electrical conductors 112 are positioned on the slab region 106 of the active medium 100. In particular, the electrical conductors 112 each contact a portion of a doped region 110 that is in the slab region 106 of the active medium 100. Accordingly, each of the doped regions 110 is doped at a concentration that allows it to provide electrical communication between an electrical conductor 112 and one of the doped regions 110 in the active medium 100. As a result, electrical energy can be applied to the electrical conductors 112 in order to apply an electric field to the active medium 100. The region of the light-transmitting medium 90 or active medium 100 between the doped regions 110 can be undoped or lightly doped as long as the doping is insufficient for the doped material to act as an electrical conductor 112 that electrically shorts the active component.

During operation of the active component of FIG. 9 as a modulator, the electrical conductors 112 act as contact pads to which the external electronics can be connected. The external electronics can then apply electrical energy to the electrical conductors 112 so as to form an electrical field in the active medium 100. For instance, the electronics can form a voltage differential between the doped regions 110. The electrical field can be formed without generating a significant electrical current through the active medium 100. The active medium 100 can be a medium in which the Franz-Keldysh effect occurs in response to the application of the electrical field. The Franz-Keldysh effect is a change in optical absorption and optical phase by an active medium 100. For instance, the Franz-Keldysh effect allows an electron in a valence band to be excited into a conduction band by absorbing a photon even though the energy of the photon is below the band gap. To utilize the Franz-Keldysh effect the active region can have a slightly larger bandgap energy than the photon energy of the light to be modulated. The application of the field lowers the absorption edge via the Franz-Keldysh effect and makes absorption possible. The hole and electron carrier wavefunctions overlap once the field is applied and thus generation of an electron-hole pair is made possible. As a result, the active medium 100 can absorb light signals received by the active medium 100 and increasing the electrical field increases the amount of light absorbed by the active medium 100. Accordingly, the electronics can tune the electrical field so as to tune the amount of light absorbed by the active medium 100. As a result, the electronics can intensity modulate the electrical field in order to modulate the light signal. Additionally, the electrical field needed to take advantage of the Franz-Keldysh effect generally does not involve generation of free carriers by the electric field.

Suitable active media for use in the modulator include electro-absorption media such as semiconductors. However, the light absorption characteristics of different semiconductors are different. A suitable semiconductor for use with modulators employed in communications applications includes $Ge_{1-x}Si_x$ (germanium-silicon) where x is greater than or equal to zero. In some instances, x is less than 0.05, or 0.01. Changing the variable x can shift the range of wavelengths at which modulation is most efficient. For instance, when x is zero, the modulator is suitable for a range of 1610-1640 nm. Increasing the value of x can shift the range of wavelengths to lower values. For instance, an x of about 0.005 to 0.01 is suitable for modulating in the c-band (1530-1565 nm).

When the structure illustrated in FIG. 9 is employed as a light sensor, the active medium 100 can be a light-absorbing medium such as germanium. During operation of the light sensor, the electronics apply a reverse bias across the active medium 100. When the active medium 100 absorbs a light signal, an electrical current flows through the active medium 100. As a result, an electrical current through the light-absorbing medium indicates receipt of a light signal. Additionally, the magnitude of the current can indicate the power and/or intensity of the light signal. Different active media can absorb different wavelengths and are accordingly suitable for use in a light sensor depending on the function of the light sensor. A light-absorbing medium that is suitable for detection of light signals used in communications applications includes, but are not limited to, germanium, silicon germanium, silicon germanium quantum well, GaAs, and InP. Germanium is suitable for detection of light signals having wavelengths in a range of 1300 nm to 1600 nm. In some instance, the electronics can be configured to operate a structure as shown in FIG. 9 as both a modulator and a light detector.

Additional details regarding the fabrication and/or operation a light sensor with a construction such as the construction of FIG. 9 can be found in U.S. patent application Ser. No. 13/385,372, filed on Feb. 15, 2012, entitled "Optical Component Having Reduced Dependency on Etch Depth," and incorporated herein in its entirety. Additional examples of light sensors that can be included in a module component includes, but is not limited to, one or more of the light sensors disclosed in U.S. patent application Ser. No. 13/385,099, filed on Feb. 1, 2012, entitled "Optical Component Having Reduced Dependency on Etch Depth," and in U.S. patent application Ser. No. 13/136,828, filed on Aug. 10, 2011, entitled "Application of Electrical Field Power to Light-Transmitting Medium," and in Provisional U.S. Patent Application Ser. No. 61/572,841, filed on Jul. 21, 2011, entitled "Optical Device Having Light Sensor with Doped regions 110," and in U.S. patent application Ser. No. 13/065,963, filed on Apr. 1, 2011, entitled "Light Sensor Having Reduced Dark Current," and in U.S. patent application Ser. No. 12/803,136, filed on Jun. 18, 2010, entitled "System Having Light Sensor with Enhanced Sensitivity," and in U.S. patent application Ser. No. 12/589,501, filed on Oct. 23, 2009, entitled "System Having Light Sensor with Enhanced Sensitivity," and in U.S. patent application Ser. No. 12/584,476, filed on Sep. 4, 2009, entitled "Optical Device Having Light Sensor Employing Horizontal Electrical Field," each of which is incorporated herein in its entirety.

Additional details regarding the fabrication and/or operation a modulator with a construction such as the construction of FIG. 9 can be found in U.S. patent application Ser. No. 13/385,372, filed on Feb. 15, 2012, entitled "Optical Component Having Reduced Dependency on Etch Depth," and incorporated herein in its entirety. Additional examples of modulators that can be included in a module component includes, but is not limited to, one or more of the modulators disclosed in U.S. patent application Ser. No. 13/385,099, filed on Feb. 1, 2012, entitled "Optical Component Having Reduced Dependency on Etch Depth," and in U.S. patent application Ser. No. 12/660,149, filed on Feb. 19, 2010, entitled "Reducing Optical Loss in Modulator Using Depletion Region," and in U.S. patent application Ser. No. 12/653,547, filed on Dec. 15, 2009, entitled "Optical Device Having Modulator Employing Horizontal Electrical Field," and in U.S. patent application Ser. No. 12/319,718, filed on Jan. 8, 2009, entitled "High Speed Optical Modulator," and in U.S. patent application Ser. No. 11/147,403, filed on Jun. 7, 2005, entitled "High Speed Optical Intensity Modulator," each of which is incorporated herein in its entirety.

Figure 10:
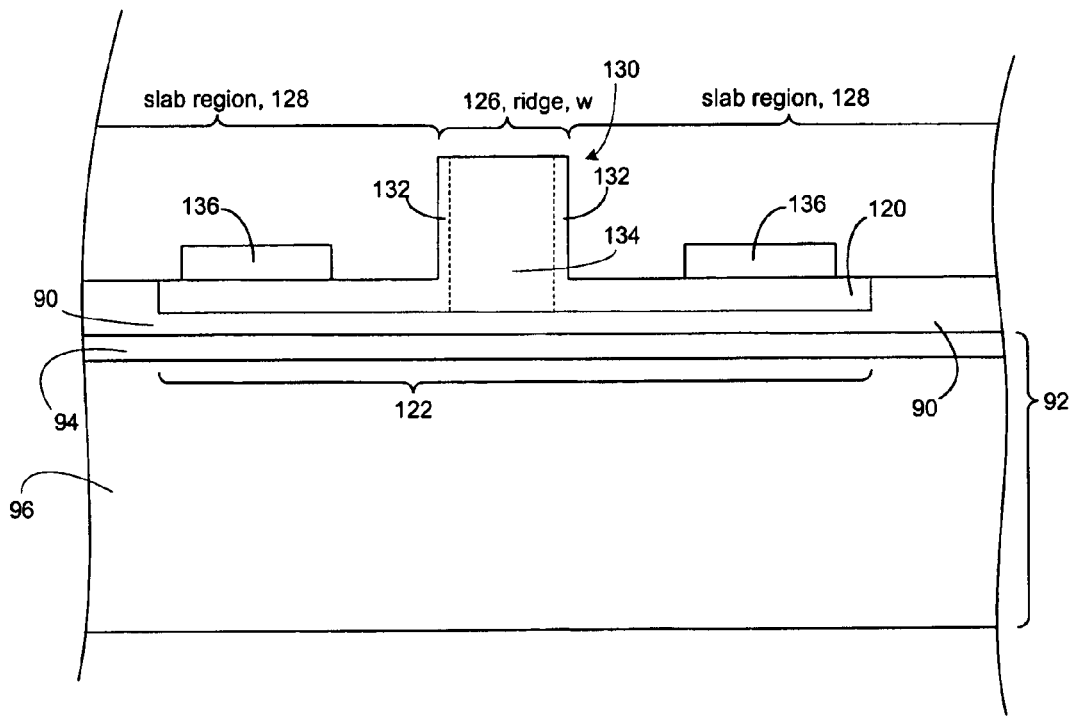
FIG. 10 is a cross section of a laser that can be included in a module component.

As discussed above, an optical component can include or consist of a laser. Examples of lasers that can be fabricated on or integrated into a silicon-on-insulator wafer include, but are not limited to, laser chips that make use of rib waveguides or ridge waveguide. FIG. 10 is a cross section of a laser that can be fabricated on wafer constructed according to FIG. 8A and FIG. 8B along with other components such as light sensors and modulators. The laser includes a gain medium 120 on the base 92. In particular, the gain medium is positioned on a seed portion 122 of the light-transmitting medium 90. The gain medium 120 includes a ridge 126 that extends upwards from slab regions 128 positioned on opposing sides of the ridge 126. The ridge 126 defines a portion of a laser cavity waveguide 130. FIG. 10 shows the ridge 126 of the gain medium 120 extending upward from slab regions 128 of the gain medium 120; however, the light-transmitting medium 90, the gain medium 120, or the base 92 can define the tops of the slab regions 128.

The ridge 126 of the gain medium 120 includes a top that connects lateral sides. At least one of the lateral sides includes an electrical conductor. In some instances, the electrical conductors are doped regions 132 of the gain medium 120 that are doped so as to make the doped region 132 electrically conducting. In the cross section of FIG. 10, the perimeter of a portion of the doped region 132 is illustrated with a dashed line to prevent it from being confused with interfaces between different materials. The interfaces between different materials are illustrated with solid lines.

The ridge 126 of the gain medium 120 also includes a gain doped region 134 that serves as the source of optical gain during the operation of the laser. FIG. 10 illustrates the gain doped region 134 contacting the doped regions 132. The doped regions 132 each extends into one of the slab regions 128 of the gain medium 120. An electrical contact 136 is in electrical communication with the portion of the doped region 132 located in one of the slab regions 128. For instance, the electrical contact 136 directly contacts the portion of doped region 132 located in the slab region 128 of the gain medium 120. Another electrical contact 136 is in electrical communication with the portion of gain doped region 134 located in one of the slab regions 128 of the gain medium 120. For instance, the electrical contact 136 directly contacts the portion of the gain doped region 134 located in the slab region 128 of the gain medium 120.

The gain medium 120 can be a material that can be grown on the seed portion 122 of the light-transmitting medium 90. In some instances, the gain medium 120 is an indirect bandgap semiconductor having a crystalline structure. Additionally, in some instances, the lowest energy level conduction band of the gain medium 120 is an indirect bandgap but the next lowest energy level conduction band is a direct bandgap. In some instances, the gain medium 120 includes or consists of one or more group IV materials. In one example, the gain medium 120 includes or consists of one or more group IV materials; can be grown on the seed portion 122 of the light-transmitting medium 90; is an indirect bandgap semiconductor having a crystalline structure; and the lowest energy level conduction band of the gain medium 120 is associated with an indirect bandgap but the next lowest energy level conduction band is associated with a direct bandgap. These materials are typically not used as electrically pumped solid state gain media because the presence of the indirect bandgap causes these materials to generate heat rather than light.

In the laser of FIG. 10, stress and doping can be combined so as to permit these materials to act as a gain medium 120. For instance, when the light-transmitting medium 90 is silicon, the gain medium 120 can be germanium or silicon-germanium. In some instances, the silicon-germanium is represented by $Ge_{1-x}Si_x$ where x is greater than or equal to zero and in some instances is less than 0.05, or 0.01. When a semiconductor is grown on another semiconductor, he atoms of the two different materials bond to each other, but do not generally have the same crystal structure. The structure of the grown material tends towards its own normal crystal structure the further you get away from the interface, but there is usually a progressive increase in distortion and defects the closer you get to the interface due to the lattice mismatch. The defects will be mostly in the grown material as this is the one with the energy to change atomic position, while the substrate already has its atoms in place. These features allows the interface between a crystalline material grown on a semiconductor to be distinguished from other types of material interfaces. As a result of this interface, when the mismatch between the lattice structures, due to differences in the lattice packing arrangements of the different materials and/or from differences in the spacing between the atoms in materials having similarly packing arrangements, the semiconductors experience stress. As a result, when a material such as germanium or silicon-germanium is grown on silicon, there is a lattice mismatch that causes the gain medium 120 to be strained. The strain on the gain medium 120 causes the energy difference between the direct and indirect band gaps to be reduced, but the indirect gap is still lower energy and electrons will accordingly tend to occupy these levels. The remaining difference in energy can be compensated by filling this lower energy indirect gap levels by heavy n-doping.

The level of doping in the gain doped region 134 is selected such that the combination of doping and stress causes the lowest energy conduction band to stay filled with electrons during operation of the laser. Because the lowest energy conduction band of these materials is associated with an indirect bandgap, the indirect bandgap remains filled during operation of the laser. Since the lowest energy level conduction band is not available for excited of electrons, the electrons are excited into the next lowest energy level conduction band. When next lowest energy level conduction band is associated with a direct band gap, the next lowest energy level conduction band becomes the source of photons in the laser.

While the above description describes the gain medium 120 as having the lowest energy level conduction band associated with an indirect bandgap and the next lowest energy level conduction band as being associated with a direct bandgap, materials where more than one of the lowest energy level conduction bands are each associated with an indirect bandgap can also be used. In these instances, the laser is constructed such that each of the lowest energy level conduction bands that are associated with an indirect bandgap remains filled with electrons during the operation of the laser. As a result, the lowest energy level conduction band that is associated with a direct bandgap becomes the source of photons in the laser.

The gain doped region 134 can include an n-type dopant in order to cause the electrons to fill the lowest energy conduction band. As a result, the gain doped region 134 can be an n-type doped region 132. One of the doped regions 132 can include an n type dopant and can also be an n-type doped region 132 and the other doped region 132 can include p-type dopants and can be p-type doped regions 132. In some instances, the doped regions 132 are more heavily doped than the gain doped region 134. For instance, the doped regions 132 can include a higher concentration of n-type dopant than the gain doped region 134. These arrangements allow the doped region 132 and the second doped regions 132 to perform the electrical conduction and contact functions while also permitting the gain medium 120 to have a dopant concentration that moves electrons into the lowest energy conduction band.

The type of dopant can be dependent on the type of semiconductor being doped. When the semiconductor is silicon, germanium, or silicon-germanium, suitable N-type dopants include, but are not limited to, phosphorus and/or arsenic and suitable P-type dopants include, but are not limited to, boron. A suitable concentration for dopant in the gain doped region 134 includes concentrations greater than $5 \times 10^{18}$ cm$^{-3}$, $1 \times 10^{19}$ cm$^{-3}$, or $5 \times 10^{19}$ cm$^{-3}$, and/or less than $1 \times 10^{20}$ cm$^{-3}$, $5 \times 10^{20}$ cm$^3$, or $1 \times 10^{21}$ cm$^{-3}$. A suitable concentration for dopant in the doped regions 132 and/or in the second doped region 132 29 includes concentrations greater than $5 \times 10^{19}$ cm$^{-3}$, $1 \times 10^{20}$ cm$^{-3}$, or $5 \times 10^{20}$ cm$^{-3}$, and/or less than $1 \times 10^{20}$ cm$^{-3}$, $5 \times 10^{21}$ cm$^{-3}$, or $1 \times 10^{22}$ cm$^{-3}$.

In order to form a laser cavity having a cross section such as the cross section of FIG. 10, the module includes return components that cause the light signal to have multiple passes through the gain medium 120 before exiting the gain medium 120 as laser output. For instance, the component can include optical gratings and/or partially reflective surfaces positioned so as to form a laser cavity. Additional details regarding the incorporation of these return components into a module can be found in U.S. patent application Ser. No. 13/506,629, filed on May 2, 2012, entitled "Integration of Laser into Optical Platform," and incorporated herein in its entirety.

During operation of the laser, the laser is electrically pumped. For instance, the electrical contacts 136 act as contact pads to which the external electronics can be connected. The external electronics apply electrical energy to the electrical contacts 136 such that an electrical current flows from one of the electrical contacts 136 to the other. The electrical current flows through one of the doped regions 132, the gain doped region 134 and into the other doped region 132. Since the doped regions 132 each extends up a lateral side of the ridge 126 of the gain medium 120, the electrical current flows through the ridge 126 of the gain medium 120. The flow of the electrical current through the gain doped region 134 provides the gain to the laser.

Figure 11A:
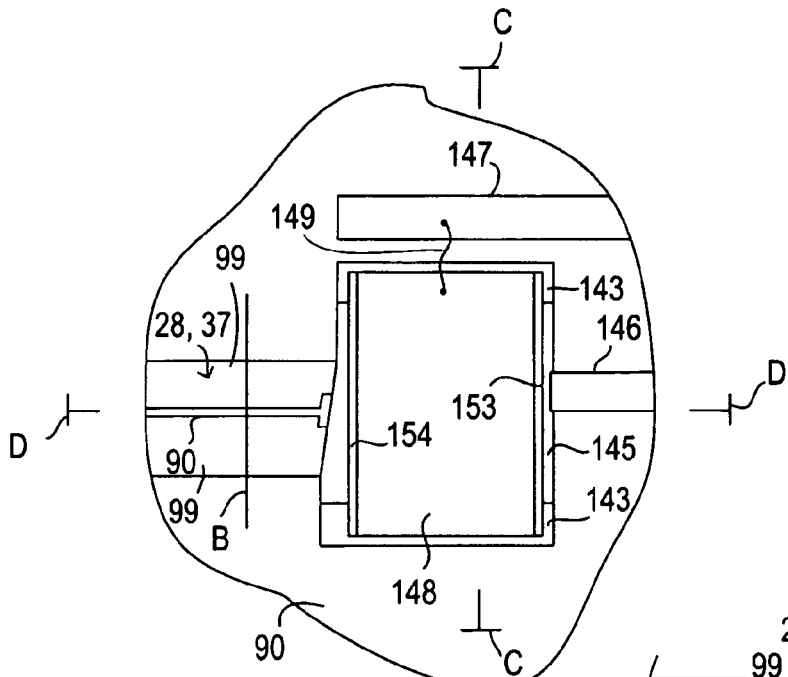
FIG. 11A through FIG. 11D illustrates a laser built on a chip that is separate from a wafer and is then integrated into the wafer before the devices on the wafer are separated from one another and from the wafer.
Figure 11B:
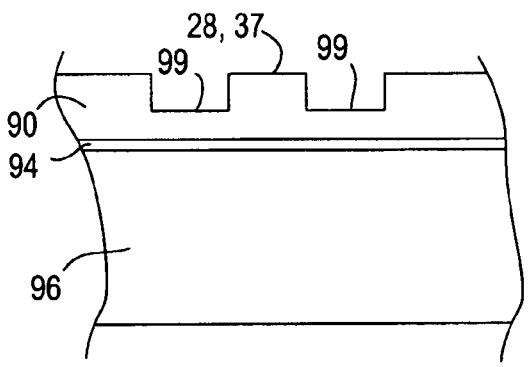
Figure 11C:
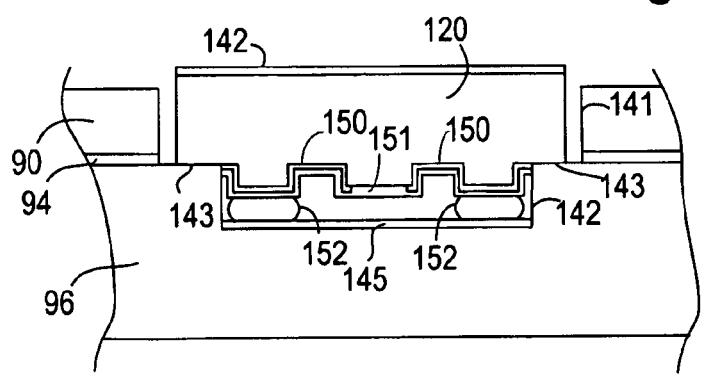
Figure 11D:
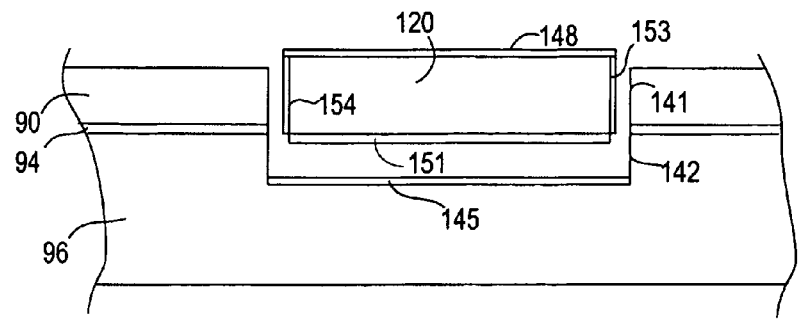

The laser of FIG. 10 is built directly into wafer, however, the lasers can be constructed on a separate chip and then integrated into the wafer before separation of the devices on the wafer. For instance, FIG. 11A through FIG. 11D illustrates a portion of a wafer having a device where a laser chip that is separate from a wafer and is the integrated into the device before the devices on the wafer are separated from one another and from the wafer. FIG. 11A is a topview of the portion of the device where the chip is integrated into the device. FIG. 11B is a cross section of the device shown in FIG. 11A taken along the line labeled B. The line labeled B extends through a waveguide that receives the laser output such as a laser waveguide 28 disclosed in FIG. 2A or a splitter waveguide 37 shown in FIG. 2B. Accordingly, FIG. 11B can represent a cross-section of a laser waveguides 28 or a splitter waveguide 37. FIG. 11C is a cross section of a portion of the device from FIG. 11A taken along a line extending between the brackets labeled C in FIG. 11A. FIG. 11D is a cross section of a portion of the device from FIG. 11A taken along a line extending between the brackets labeled D in FIG. 11A.

A first recess 141 extends through the light-transmitting medium 90 and the insulator 94. A second recess 142 extends into the bottom of the first recess 141 such that the substrate 96 forms shelves 143 in the bottom of the second recess 142. A first conducting layer 145 is positioned in the bottom of the second recess 142. A first conductor 146 on the silicon slab is in electrical communication with the first conducting layer 145. A second conductor 147 on the light-transmitting medium 90 is positioned adjacent to the first recess 141.

A gain medium 120 is positioned in the first recess 141 and rests on the shelves 143. A second conducting layer 148 is positioned on the gain medium 120. A third conductor 149 provides electrical communication between the second conducting layer 148 and the second conductor 147.

Three ridges extend into the second recess 142. The central ridge defines a portion of a laser cavity waveguide 130 through which the light is guide and amplified. The outermost ridges have a passivation layer 150 that is in electrical communication with the first conducting layer 145. Suitable passivation layers 150 include, but are not limited to, dielectrics and electrical insulators. Example passivation layers 150 include, but are not limited to, silicon nitride and silica. A conductor 151 extends across the central ridge and the outermost ridges such that the conductor 151 contacts the gain medium 120 in the central ridge. Additionally, the passivation layers 150 are each between the conductor 151 and the gain medium 120. Suitable conductors 151 include, but are not limited to, metals such as gold or aluminum. Electrical communication between the conductor 151 and the first conducting layer 145 can be achieved through a conducting medium 152 such as solder. As a result, the conducting medium 152 and the first conducting layer 145 provide electrical communication between the first conductor 146 and the passivation layers 150. When the passivation layers are electrically insulating, an electrical current that flows through the conductor 151 flows primarily or entirely through the central ridge of the gain medium 120.

The gain medium 120 includes a reflecting surface 153 on the gain medium 120. Suitable reflecting surfaces 153 include a layer of metal on the layer of gain medium 120. The side of the gain medium 120 opposite the reflecting surface optionally includes an anti-reflective coating 154. The beam of light exits the gain medium 120 through the anti-reflective coating 154. Suitable anti-reflective coatings 154 include, but are not limited to, single-layer coatings such as silicon nitride or aluminum oxide, or multilayer coatings which may contain silicon nitride, aluminum oxide, and/or silica.

Suitable gain media include, but are not limited to, InP chips. The electrical communication between the second conducting layer 148 and the second conductor 147 can be achieved using traditional techniques such as wire bonding. The electrical communication between the central ridge and the first conductor 146 can be achieved through traditional techniques such as solder bonding.

The beam of light can be generated from the gain medium 120 by causing an electrical current to flow through the gain medium 120. The electrical current can be generated by applying a potential difference between the first conductor 146 and the second conductor 147. The potential difference can be provided by electronics. The electronics can be included on the device or can be separate from the device but electrically coupled with the device.

Other examples of lasers that can be included in the above components disclosed in U.S. patent application Ser. No. 13/506,629, filed on May 2, 2012, entitled "Integration of Laser into Optical Platform," and in U.S. patent application Ser. No. 13/317,340, filed on Oct. 14, 2011, entitled "Gain medium 120 Providing Laser and Amplifier Functionality to Optical Device," and U.S. patent application Ser. No. 12/215,693, filed on Jun. 28, 2008, entitled "Interface Between Light Source and Optical Component," each of which is incorporated herein in its entirety.

Figure 12A:
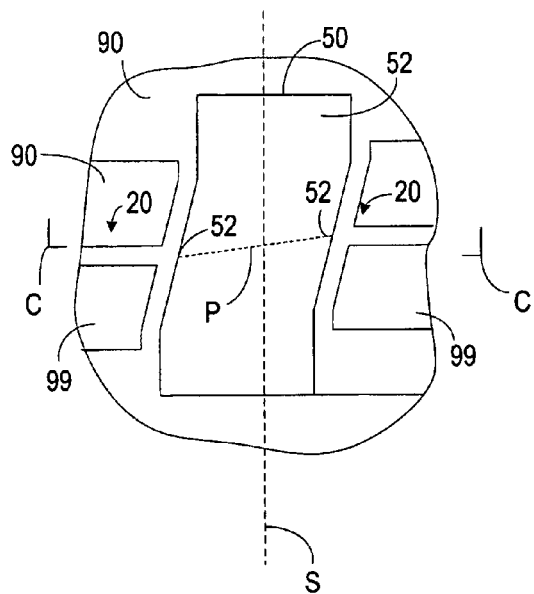
FIG. 12A through FIG. 12C illustrate a suitable facet recess formed at the interface of two devices on a wafer having a light-transmitting medium on a base.
Figure 12B:
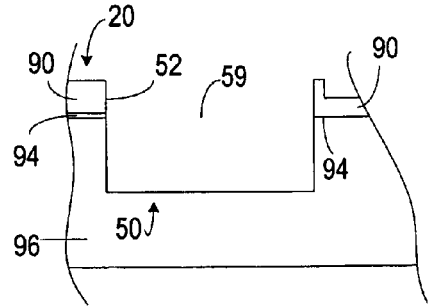
Figure 12C:
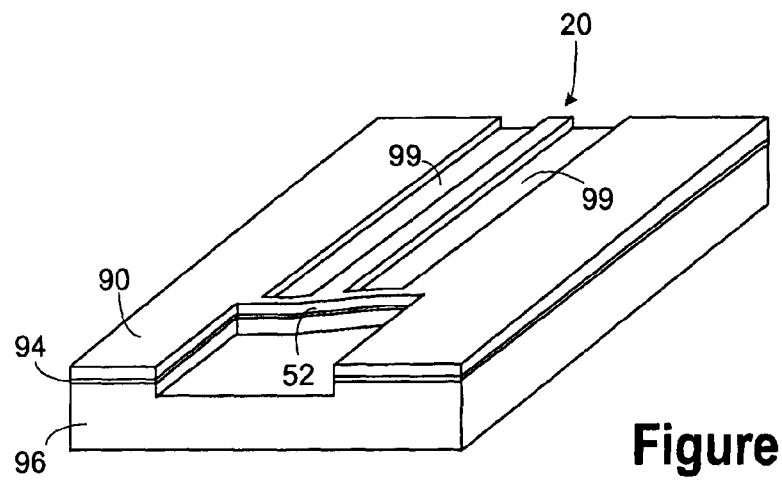

As noted above, facets 52 can be formed before the devices are separated from one another and/or from the wafer by forming a facet recess. FIG. 12A through FIG. 12C illustrate a suitable facet recess formed at the interface of two devices on a wafer having a light-transmitting medium 90 on a base 92. An example of such a wafer is a silicon-on-insulator wafer. FIG. 12A is a topview of the portion of the wafer having a facet recess. FIG. 12B is a cross section of the wafer shown in FIG. 12A taken along a line extending between the brackets labeled C in FIG. 12A. FIG. 12C is a perspective view of one of the devices shown in FIG. 12A after the devices are separated along the line labeled S in FIG. 12A. The perspective view shows the resulting facet and the portion of the facet recess that remains intact on the device after the separation.

The facet recess 50 extends through the light-transmitting medium 90 and into the base. For instance, the facet recess 50 extends through insulator 94 and into the substrate 96. The facet recess can be etched into the wafer using traditional optical device fabrication techniques. The facet recess 50 is positioned between two testing waveguides 20 and the sides of the facet recess 50 define a facet 52 at the terminal end of each testing waveguide 20. In particular, a surface of the light-transmitting medium 90 serves as a facet through which light signals enter and/or exit each testing waveguide 20. A suitable facet recess 50 can be etched before or after the testing waveguides 20 are formed.

As is evident from FIG. 12A, the facet of a testing waveguides 20 need not be perpendicular to the direction of propagation of a light signal in the testing waveguides 20 at the facet of the testing waveguide. The non-perpendicular angle of the facets can reduce the difficulties associated with back reflection. Suitable angles for the facets 52 include angles between 80 and 90° relative to the direction of propagation of a light signal in the testing waveguides 20 at the facet of the testing waveguide.

As illustrated by the dashed line labeled C in FIG. 12A, the testing waveguides 20 are arranged such that they are optically aligned with one another. For instance, a light signal that exits from one of the testing waveguides 20 travels through the medium 54 in the facet recess 50, through the facet 52 of the opposing testing waveguide 20, and enters the opposing testing waveguide 20. The optical alignment of the testing waveguides 20 may need to correct for the effects of refraction. As a result, the testing waveguides 20 may be optically aligned even though they are not mechanically aligned. For instance, in FIG. 12A, the centers of the facets 52 are not positioned directly across from one another in the facet recess. As a result, a light signal that exited through a facet 52 and continued to travel in the direction that it was traveling immediately before passing through the facet would not be well coupled into the opposing facet 52. In some instances, the testing waveguides 20 are both optically aligned and mechanically aligned. Since the testing waveguides are optically aligned across the facet recess 50, the facet recess 50 does not interfere with the testing of the devices before separation of the devices from one another and/or the wafer.

Figure 12D:
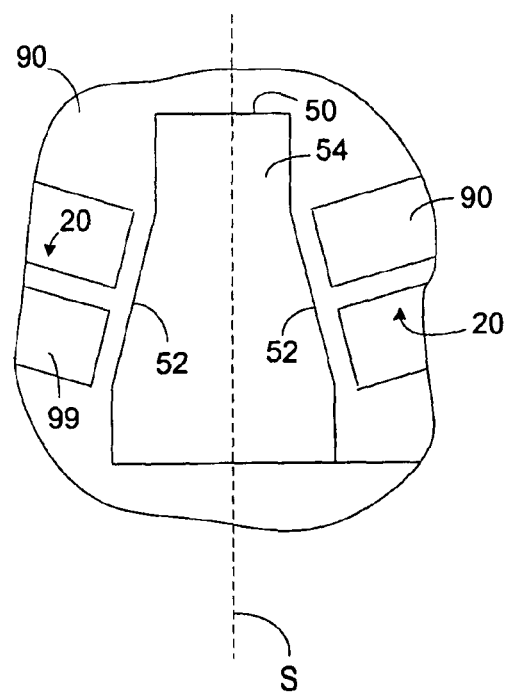
FIG. 12D is a topview of a portion of another embodiment of a wafer having a facet recess.

FIG. 12A illustrates a possible arrangement of optically aligned testing waveguides relative to a facet recess. FIG. 12D is a topview of a portion of another embodiment of a wafer having a facet recess. The illustrated testing waveguides 20 are optically aligned but are not mechanically aligned.

The devices can be separated from one another along the line labeled S in FIG. 12A. A blade or other instrument may pass between the facets 52 during the separation of the facets. As a result, the facet recess 50 can be configured such that facets are spaced sufficiently far apart that one or more of the facets are not damaged during separation. As a result, the facet can be used in testing before separation of the devices and can be used after the separation of the devices. In some instances, a suitable separation between the facets is at least 20 μm. As is evident in FIG. 12C, a portion of the facet recess 50 may be left on the devices after separation. In some instances, the bottom of the facet recess 50 can be used as a groove into which a waveguide such as an optical fiber can be placed or into which an optical component such as a laser or light sensor can be placed. Alternately, the remaining portions of the facet recess can be removed using techniques such as planarization and/or polishing More than two testing waveguides 20 can end at a recess. For instance, the facet recesses 50 illustrated in FIG. 7 can be replaced with a single continuous facet recess 50 where the testing waveguides 20 from one of the devices all terminate on one side of the facet recess and the testing waveguides from the other device all terminate on the opposing side of the facet recess.

Although the facet recesses 50 are disclosed as being positioned at the end of testing waveguides 20, a facet recess can be positioned at a terminal end of one or more other waveguides that are not involved in testing of the devices.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:
1. A system, comprising:
a plurality of optical devices on a wafer,
the optical devices including optical components,
the optical components include light-generating components that are each configured to generate a light signal in response to application of electrical energy to the light-generating component from electronics that are external to the wafer, and
the optical components include receiver components that are each configured to output an electrical signal that is a function of light received by the receiver component; and
testing waveguides on the wafer, each testing waveguide provides optical communication between a first portion of the optical components and a second portion of the optical components,
the first portion of the optical components includes one or more of the light-generating components and the second portion of the optical components includes one or more of the receiver components, and
each testing waveguides extends from within a boundary of one of the optical devices across the boundary of the optical device.

2. The system of claim 1, wherein the first portion of the optical components and the second portion of the optical components to which each testing waveguide provides optical communication is located on the same device.

3. The system of claim 1, wherein the first portion of the optical components and the second portion of the optical components to which each testing waveguide provides optical communication are located on different devices.

4. The system of claim 1, wherein each of the devices on the wafer is the same.

5. The system of claim 1, wherein each of the devices on the wafer is not the same.

6. The system of claim 1, wherein the first portion of components and/or the second portion of components includes passive optical components.

7. The system of claim 6, wherein the passive components include one or more components selected from a group consisting of multiplexer, demultiplexer, and splitter.

8. The system of claim 1, wherein the first portion of components and/or the second portion of components includes active optical components in addition to the one or more light-generating components and the one or more receiver components.

9. The system of claim 8, wherein the active optical components include a modulator.

10. The system of claim 1, wherein each device is a transceiver.

11. A method, comprising:
generating a wafer that include optical devices on a wafer,
the optical devices including optical components,
the optical components including light-generating components that each can generate a light signal in response to application of electrical energy to the light-generating component device from electronics that are external to the wafer; and
the optical components including receiver components that are each configured to output an electrical signal that is a function of light received by the receiver component, and
testing waveguides on the wafer, each testing waveguide provides optical communication between a first portion of the optical components and a second portion of the optical components, the first portion of the optical components including one or more light-generating components and the second portion of the optical components including one or more receiver components, and each testing waveguides extends from within a boundary of one of the optical devices across the boundary of the optical device;

testing the devices for performance; and separating the devices from the wafer after testing the devices for performance.

12. The method of claim 11, wherein the light-generating components include lasers and the one or more receiver components each including a light sensor, and wherein testing the devices includes driving an electrical current through one of the lasers, measuring a second electrical current through one of the light sensors that is configured to receive light from the laser through which the electrical current is driven, and comparing the measured current to a threshold.

13. The method of claim 11, wherein the first portion of the optical components and the second portion of the optical components to which each testing waveguide provides optical communication is located on the same device.

14. The method of claim 11, wherein the first portion of the optical components and the second portion of the optical components to which each testing waveguide provides optical communication are located on different devices.

15. The method of claim 11, wherein each of the devices on the wafer is the same.

16. The method of claim 11, wherein each of the devices on the wafer is not the same.

17. The method of claim 11, wherein the first portion of components and/or the second portion of components includes passive optical components.

18. The method of claim 17, wherein the passive components include one or more components selected from a group consisting of multiplexer, demultiplexer, and splitter.

19. The method of claim 11, wherein the first portion of components and/or the second portion of components includes active optical components in addition to the one or more light-generating components and the one or more receiver components.

20. The method of claim 19, wherein the active optical components include a modulator.

* * * * *